US012689467B2

(12) United States Patent
Yunusov et al.

(10) Patent No.: US 12,689,467 B2
(45) Date of Patent: Jul. 21, 2026

(54) INTERLEAVER ADAPTED FOR CHANNEL ESTIMATION QUALITY IMBALANCES

(71) Applicant: QUALCOMM Incorporated, San Diego, CA (US)

(72) Inventors: David Yunusov, Holon (IL); Amit Bar-Or Tillinger, Tel-Aviv (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 18/630,904

(22) Filed: Apr. 9, 2024

(65) Prior Publication Data

US 2025/0317238 A1       Oct. 9, 2025

(51) Int. Cl.
*H04W 72/21*       (2023.01)
*H04L 1/00*        (2006.01)
*H04W 72/232*      (2023.01)

(52) U.S. Cl.
CPC .......... *H04L 1/0071* (2013.01); *H04L 1/0057* (2013.01); *H04W 72/21* (2023.01); *H04W 72/232* (2023.01)

(58) Field of Classification Search
None
See application file for complete search history.

(56) References Cited

U.S. PATENT DOCUMENTS

| | | | | |
|---|---|---|---|---|
| 2018/0287682 A1* | 10/2018 | Kwak | .................. | H04B 7/0695 |
| 2020/0067663 A1* | 2/2020 | Liu | .................... | H04W 72/1268 |
| 2023/0083445 A1* | 3/2023 | Awadin | .................. | H04L 5/0044 |
| | | | | 370/329 |
| 2023/0109827 A1* | 4/2023 | Bhamri | ................. | H04L 5/0092 |
| | | | | 370/329 |
| 2024/0215026 A1* | 6/2024 | Shahmohammadian | .................... | H04L 5/0044 |
| 2025/0247187 A1* | 7/2025 | Muruganathan | ...... | H04L 5/0051 |

FOREIGN PATENT DOCUMENTS

| | | | | | |
|---|---|---|---|---|---|
| KR | 20200063972 A | * | 6/2020 | ........... | H04L 5/0023 |
| KR | 20210039379 A | * | 4/2021 | ........... | H04W 72/23 |
| WO | WO-2024147612 A1 | * | 7/2024 | ........... | H04L 5/0044 |

* cited by examiner

*Primary Examiner* — Kodzovi Acolatse
(74) *Attorney, Agent, or Firm* — Holland & Hart LLP

(57)              ABSTRACT
Methods, systems, and devices for wireless communications are described. A first wireless device receives or transmits, from a second wireless device, first signaling indicating a size of a precoding resource block group and an offset parameter indicating an offset between the precoding resource block group and a codeblock. The first wireless device transmits or receives second signaling indicating a resource element starting parameter and a resource element ending parameter in at least one of a time domain and a frequency domain based at least in part on the size of the precoding resource block group. The first and second wireless devices communicate coded bit streams that are interleaved in accordance with at least one of the size of the precoding resource block group, the offset parameter, the resource element starting parameter, the resource element ending parameter, or any combination thereof.

20 Claims, 19 Drawing Sheets

1525

1530

1535

1520

1500

1710

1720

1715

1705

1700

130    105    115

Network Entity

Transceiver

2010

Antenna

2015

Communications Manager

2020

Memory

Code

2030

2025

Processor

2035

2040

2005

2000

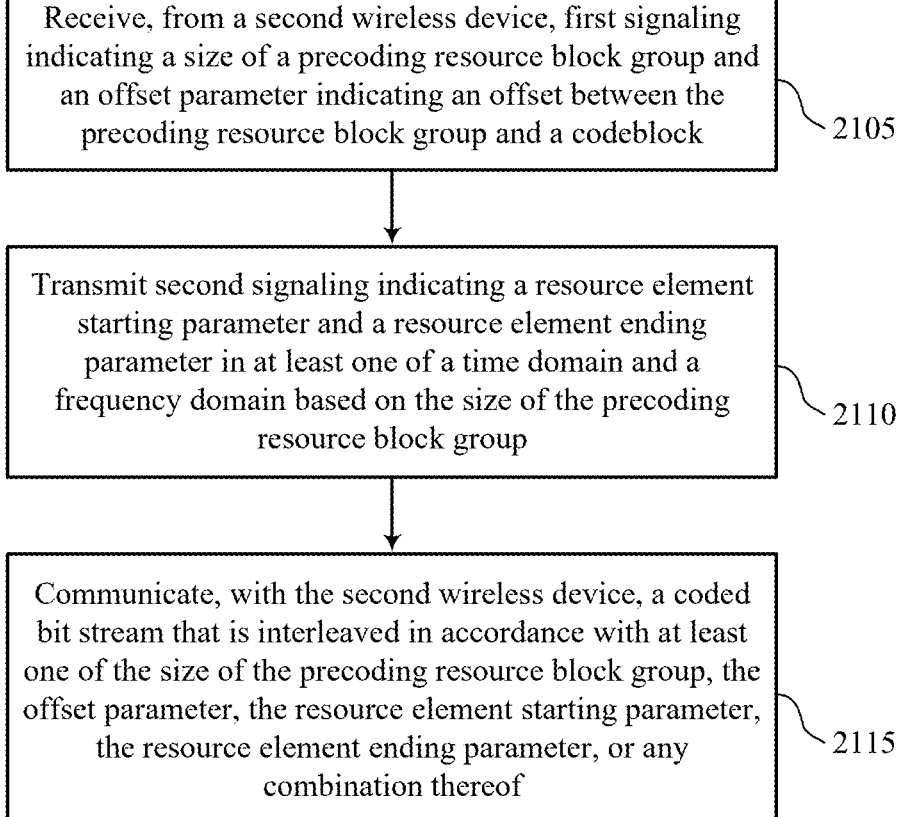

Receive, from a second wireless device, first signaling indicating a size of a precoding resource block group and an offset parameter indicating an offset between the precoding resource block group and a codeblock

2105

Transmit second signaling indicating a resource element starting parameter and a resource element ending parameter in at least one of a time domain and a frequency domain based on the size of the precoding resource block group

2110

Communicate, with the second wireless device, a coded bit stream that is interleaved in accordance with at least one of the size of the precoding resource block group, the offset parameter, the resource element starting parameter, the resource element ending parameter, or any combination thereof

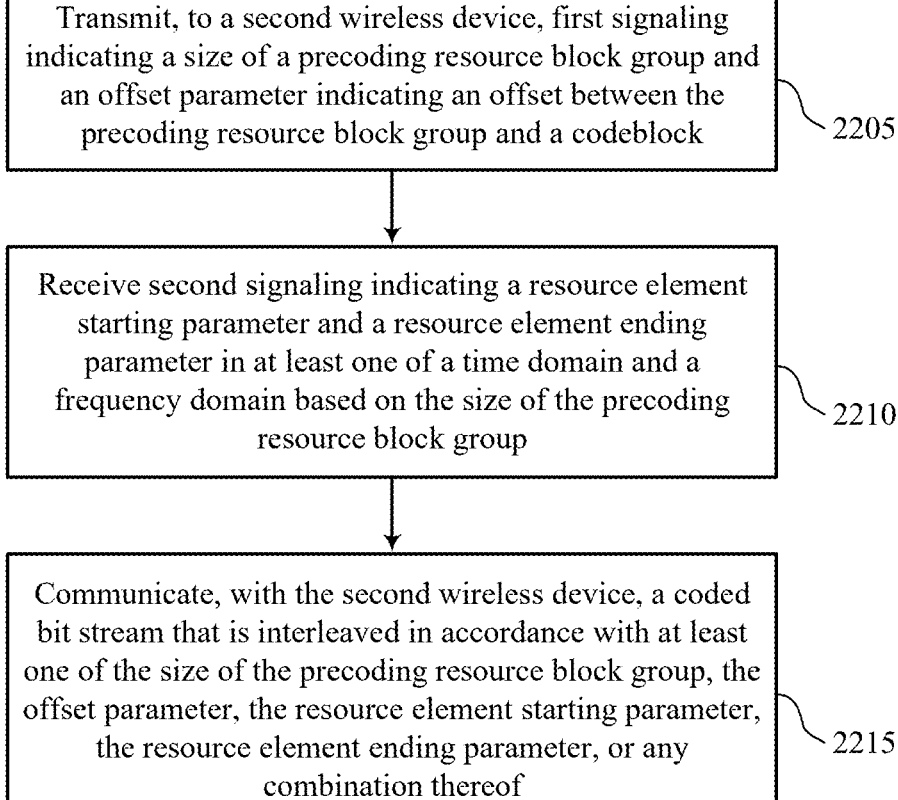

Transmit, to a second wireless device, first signaling indicating a size of a precoding resource block group and an offset parameter indicating an offset between the precoding resource block group and a codeblock

2205

Receive second signaling indicating a resource element starting parameter and a resource element ending parameter in at least one of a time domain and a frequency domain based on the size of the precoding resource block group

2210

Communicate, with the second wireless device, a coded bit stream that is interleaved in accordance with at least one of the size of the precoding resource block group, the offset parameter, the resource element starting parameter, the resource element ending parameter, or any combination thereof

INTERLEAVER ADAPTED FOR CHANNEL ESTIMATION QUALITY IMBALANCES

FIELD OF TECHNOLOGY

The following relates to wireless communications, including using an interleaver adapted for channel estimation quality imbalances.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support interleaver adapted for channel estimation quality imbalances. For example, the described techniques provide for an updated interleaver that encodes bit streams to protect systematic bits in the areas of where the codeblocks have higher channel estimation processing gain by placing less important parity bits at the edges that have lower channel estimation processing gain. Several parameters are defined and communicated between wireless communications devices (or an interleaver and de-interleaver) in order to facilitate the updated interleaver.

A method for wireless communications by a first wireless device is described. The method may include receiving, from a second wireless device, first signaling indicating a size of a precoding resource block group and an offset parameter indicating an offset between the precoding resource block group and a codeblock, transmitting second signaling indicating a resource element starting parameter and a resource element ending parameter in at least one of a time domain and a frequency domain based on the size of the precoding resource block group, and communicating, with the second wireless device, a coded bit stream that is interleaved in accordance with at least one of the size of the precoding resource block group, the offset parameter, the resource element starting parameter, the resource element ending parameter, or any combination thereof.

A first wireless device for wireless communications is described. The first wireless device may include one or more memories storing processor executable code, and one or more processors coupled with the one or more memories. The one or more processors may individually or collectively be operable to execute the code to cause the first wireless device to receive, from a second wireless device, first signaling indicating a size of a precoding resource block group and an offset parameter indicating an offset between the precoding resource block group and a codeblock, transmit second signaling indicating a resource element starting parameter and a resource element ending parameter in at least one of a time domain and a frequency domain based on the size of the precoding resource block group, and communicate, with the second wireless device, a coded bit stream that is interleaved in accordance with at least one of the size of the precoding resource block group, the offset parameter, the resource element starting parameter, the resource element ending parameter, or any combination thereof.

Another first wireless device for wireless communications is described. The first wireless device may include means for receiving, from a second wireless device, first signaling indicating a size of a precoding resource block group and an offset parameter indicating an offset between the precoding resource block group and a codeblock, means for transmitting second signaling indicating a resource element starting parameter and a resource element ending parameter in at least one of a time domain and a frequency domain based on the size of the precoding resource block group, and means for communicating, with the second wireless device, a coded bit stream that is interleaved in accordance with at least one of the size of the precoding resource block group, the offset parameter, the resource element starting parameter, the resource element ending parameter, or any combination thereof.

A non-transitory computer-readable medium storing code for wireless communications is described. The code may include instructions executable by one or more processors to receive, from a second wireless device, first signaling indicating a size of a precoding resource block group and an offset parameter indicating an offset between the precoding resource block group and a codeblock, transmit second signaling indicating a resource element starting parameter and a resource element ending parameter in at least one of a time domain and a frequency domain based on the size of the precoding resource block group, and communicate, with the second wireless device, a coded bit stream that is interleaved in accordance with at least one of the size of the precoding resource block group, the offset parameter, the resource element starting parameter, the resource element ending parameter, or any combination thereof.

In some examples of the method, first wireless devices, and non-transitory computer-readable medium described herein, the first signaling further indicates whether the offset between the precoding resource block group and the codeblock may be a vector in a frequency domain or a time domain and the second signaling further indicates whether the resource element starting parameter and the resource element ending parameter may be in the frequency domain or the time domain.

In some examples of the method, first wireless devices, and non-transitory computer-readable medium described herein, communicating with the second wireless device may include operations, features, means, or instructions for receiving, from the second wireless device, the coded bit stream and decoding the coded bit stream based on the offset parameter, the resource element starting parameter, and the resource element ending parameter.

In some examples of the method, first wireless devices, and non-transitory computer-readable medium described herein, decoding the coded bit stream may include operations, features, means, or instructions for decoding the coded bit stream into a set of multiple resource elements, where a first set of the set of multiple resource elements includes parity bits and systematic bits, and where a second set of the set of multiple resource elements includes parity bits and no systematic bits.

In some examples of the method, first wireless devices, and non-transitory computer-readable medium described herein, the coded bit stream includes a first set of parity bits located at a beginning of the precoding resource block group and at an ending of the precoding resource block group.

In some examples of the method, first wireless devices, and non-transitory computer-readable medium described herein, the beginning of the precoding resource block group and the ending of the precoding resource block group may be based on at least one processing gain threshold.

In some examples of the method, first wireless devices, and non-transitory computer-readable medium described herein, the first signaling may be received via a first radio resource control message, first downlink control information, or first uplink control information and the second signaling may be received via a second radio resource control message, second downlink control information, or second uplink control information.

In some examples of the method, first wireless devices, and non-transitory computer-readable medium described herein, the offset parameter may be a resource element offset or a time-symbols offset.

In some examples of the method, first wireless devices, and non-transitory computer-readable medium described herein, the precoding resource block group includes a set of resource precoding resource blocks which may be consecutive in a frequency domain.

A method for wireless communications by a first wireless device is described. The method may include transmitting, to a second wireless device, first signaling indicating a size of a precoding resource block group and an offset parameter indicating an offset between the precoding resource block group and a codeblock, receiving second signaling indicating a resource element starting parameter and a resource element ending parameter in at least one of a time domain and a frequency domain based on the size of the precoding resource block group, and communicating, with the second wireless device, a coded bit stream that is interleaved in accordance with at least one of the size of the precoding resource block group, the offset parameter, the resource element starting parameter, the resource element ending parameter, or any combination thereof.

A first wireless device for wireless communications is described. The first wireless device may include one or more memories storing processor executable code, and one or more processors coupled with the one or more memories. The one or more processors may individually or collectively be operable to execute the code to cause the first wireless device to transmit, to a second wireless device, first signaling indicating a size of a precoding resource block group and an offset parameter indicating an offset between the precoding resource block group and a codeblock, receive second signaling indicating a resource element starting parameter and a resource element ending parameter in at least one of a time domain and a frequency domain based on the size of the precoding resource block group, and communicate, with the second wireless device, a coded bit stream that is interleaved in accordance with at least one of the size of the precoding resource block group, the offset parameter, the resource element starting parameter, the resource element ending parameter, or any combination thereof.

Another first wireless device for wireless communications is described. The first wireless device may include means for transmitting, to a second wireless device, first signaling indicating a size of a precoding resource block group and an offset parameter indicating an offset between the precoding resource block group and a codeblock, means for receiving second signaling indicating a resource element starting parameter and a resource element ending parameter in at least one of a time domain and a frequency domain based on the size of the precoding resource block group, and means for communicating, with the second wireless device, a coded bit stream that is interleaved in accordance with at least one of the size of the precoding resource block group, the offset parameter, the resource element starting parameter, the resource element ending parameter, or any combination thereof.

A non-transitory computer-readable medium storing code for wireless communications is described. The code may include instructions executable by one or more processors to transmit, to a second wireless device, first signaling indicating a size of a precoding resource block group and an offset parameter indicating an offset between the precoding resource block group and a codeblock, receive second signaling indicating a resource element starting parameter and a resource element ending parameter in at least one of a time domain and a frequency domain based on the size of the precoding resource block group, and communicate, with the second wireless device, a coded bit stream that is interleaved in accordance with at least one of the size of the precoding resource block group, the offset parameter, the resource element starting parameter, the resource element ending parameter, or any combination thereof.

In some examples of the method, first wireless devices, and non-transitory computer-readable medium described herein, communicating with the second wireless device may include operations, features, means, or instructions for transmitting, from the second wireless device, the coded bit stream.

Some examples of the method, first wireless devices, and non-transitory computer-readable medium described herein may further include operations, features, means, or instructions for encoding a set of multiple resource elements into the coded bit stream, where a first set of the set of multiple resource elements includes parity bits and systematic bits, and where a second set of the set of multiple resource elements includes parity bits and no systematic bits.

In some examples of the method, first wireless devices, and non-transitory computer-readable medium described herein, the coded bit stream includes a first set of parity bits located at a beginning of the precoding resource block group and at an ending of the precoding resource block group.

In some examples of the method, first wireless devices, and non-transitory computer-readable medium described herein, the beginning of the precoding resource block group and the ending of the precoding resource block group may be based on at least one processing gain threshold.

In some examples of the method, first wireless devices, and non-transitory computer-readable medium described herein, the first signaling may be received via a first radio resource control message, first downlink control information, or first uplink control information and the second signaling may be received via a second radio resource control message, second downlink control information, or second uplink control information.

In some examples of the method, first wireless devices, and non-transitory computer-readable medium described herein, the offset parameter may be a resource element offset or a time-symbols offset.

In some examples of the method, first wireless devices, and non-transitory computer-readable medium described herein, the precoding resource block group includes a set of resource precoding resource blocks which may be consecutive in a frequency domain.

BRIEF DESCRIPTION OF THE DRAWINGS

FIGS. 21 and 22 show flowcharts illustrating methods that support interleaver adapted for channel estimation quality imbalances in accordance with one or more aspects of the present disclosure.

DETAILED DESCRIPTION

Figure 1:
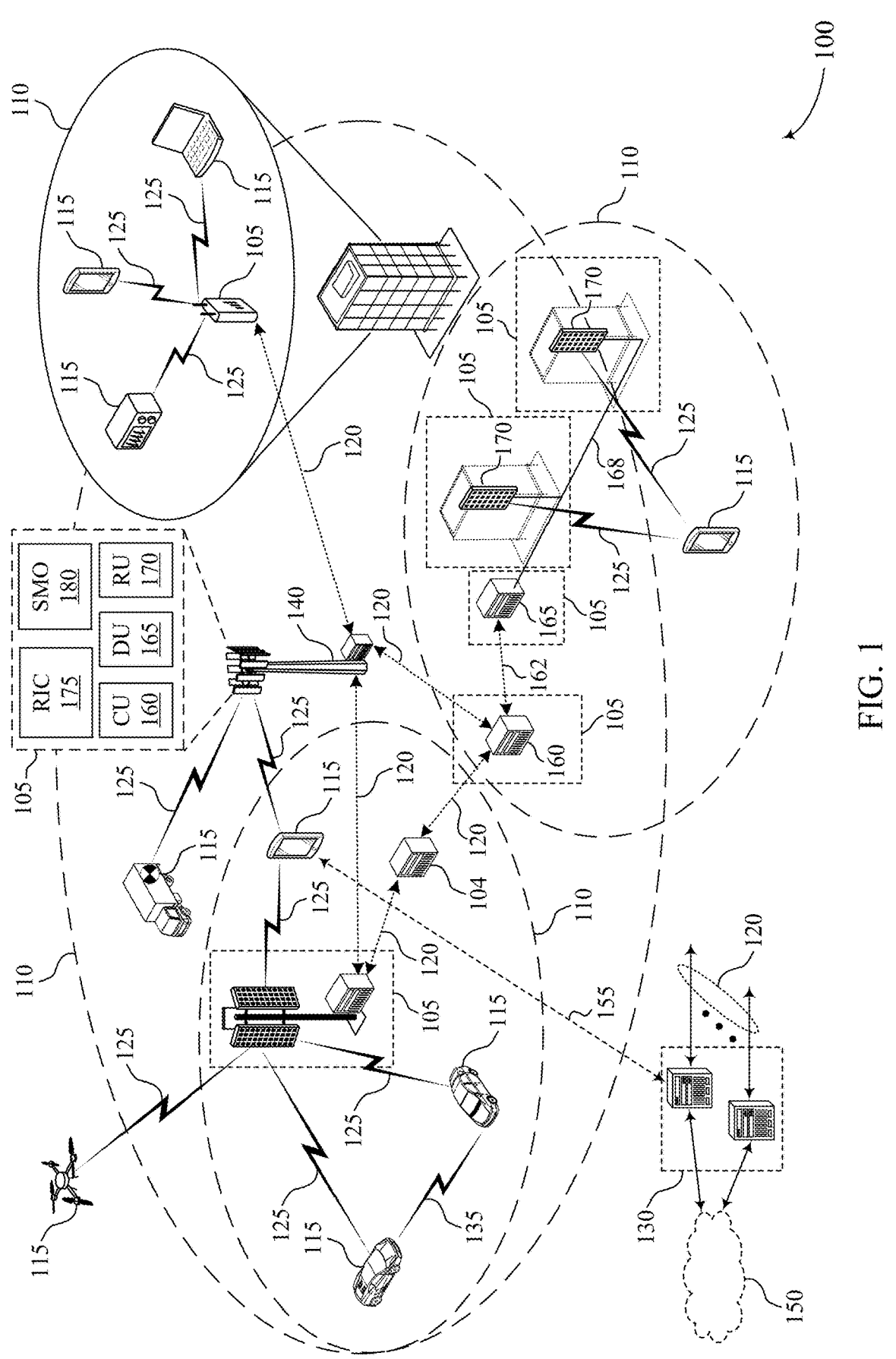
FIG. 1 shows an example of a wireless communications system that supports an interleaver adapted for channel estimation quality imbalances in accordance with one or more aspects of the present disclosure.

Wireless communications systems may encode bitstreams before transmission and decode the bitstream after reception. 5G NR systems may use low-density parity-check (LDPC) codes for encoding and decoding. LDPC codes are linear error-correcting codes. In the 5G NR standard, an interleaver operation is defined to interleave the coded bits such that the bit stream, which is implemented by writing the data row-by-row and reading column-by-column, that will effectively allocate the systematic bits to the strong constellation LLRs, and the parity bits to the weaker LLRs. The interleaver operation interleaves the coded bits such that each resource element consists of both systematic and parity bits. However, simulation results have shown the systematic bits to be more important than the parity bits. The legacy interleaver approach apportions the systematic and parity bits in such a way that some of the systematic bits may be subject to low channel estimation processing gain. Techniques, devices, and systems described herein provide mechanisms to allocate the systematic and parity bits to resource elements such that improvements to the processing gain are achieved for the systematic bits.

A bitstream may be partitioned into segments, which may be utilized by an interleaver and de-interleaver. A Precoding Resource Block Group (PRG) of size P' may partition the bandwidth of the system, where each PRG consists of consecutive physical resource blocks (PRBs) in the frequency domain. A resource element (RE) is one subcarrier during one orthogonal frequency division multiplexing (OFDM) symbol, and is the smallest physical resource in NR. A RE is uniquely determined by the index (k,l), wherein k is the index in the frequency domain and l is the OFDM symbol position in the time domain. A physical resource block are resource blocks that are used for actual transmission and reception. A set of PRBs may belong to a bandwidth part.

The size P' of a PRG may be determined by the network, such that each partitioning consists of consecutive resource blocks in the frequency domain. Within the set of consecutive resource blocks in the PRG for a specific group, a UE may assume that the same precoder is used for all of the scheduled PRBs within the PRG. However, it is not guaranteed that there is any correlation or phase continency between PRGs. There may not be a correlation of phase continence between different PRGs due to the use of different precoders per PRG.

These differences at the edges of the PRGs may impact the channel estimation on the UE side. In the frequency domain, if the channel estimation at the edges of the PRGs is impacted, this may reduce the processing gain and overall reduce the quality of the carriers on the edges of the PRGs. This results in negative impacts in the frequency domain.

There may be negative impacts within the time domain as well. A high Doppler spread channel reduces the time correlation between symbol, thus OFDM symbols that are far from a demodulation reference signal (DMRS) will suffer from a low processing gain due to filters used, such as time duration interpolation filters or other filters. If the channel has a low Doppler spread, the consecutive symbols may have the same, or nearly the same, channel estimation because the channel varies slowly. A channel may have low Doppler spread, for example, when a wireless device, such as a UE, is stationary or moving slowly with respect to the devices with which it is communicating. But in high Doppler spread situation, where the UE may have high velocity or acceleration, the channel varies rapidly. In high Doppler spread situations, there is a chance that there may be no correlation between consecutive OFDM symbols. This may result in the channel estimation not being valid between one estimation to the next. The UE may perform channel estimation on the DMRS, because the symbols near the DMRS symbol may have a better channel estimation because there is a higher time correlation within the channel estimation block. However, symbols that are far from the DMRS, such as those on the edges of the overall subframe, may suffer from low quality channel estimation.

Techniques described herein provide an interleaver adapted for channel estimation quality imbalances. Examples of the interleaver may allocate each resource element or symbol either with systematic and parity bits or parity bits only, combined with the PRG/DMRS locations configuration. Whether systematic and parity bits are used, or only parity bits are used, may be determined based at least in part on the PRG or the DMRS location configurations. The interleaver may set the constellation points or resource elements that consists of parity bits only on the "edge" frequencies for each PRG and/or far from each DMRS. This placement of the parity bits helps the UE to overcome the low channel estimation accuracy because it reduces the impact on the systematic log likelihood ratios (LLRs) compared with the legacy approach. The rest of the parity bits (those parity bits not located on the edge frequencies of the PRGs or far from the DMRSs) and the systematic bits may be applied on the rest of the resources according to the legacy approach.

Various parameters and offsets are defined, and signaled between the wireless communications devices, in order to facilitate the updated interleaver.

Aspects of the disclosure are initially described in the context of wireless communications systems. Aspects of the disclosure are initially described in the context of block diagrams, graphs, and process flow diagrams. Aspects of the disclosure are further illustrated by and described with reference to apparatus diagrams, system diagrams, and flowcharts that relate to interleaver adapted for channel estimation quality imbalances.

FIG. 1 shows an example of a wireless communications system 100 that supports an interleaver adapted for channel estimation quality imbalances in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multicarrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs.

In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

An interleaver using techniques described herein may allocate each resource element or symbol either with both systematic and parity bits, or only parity bits. The UE or network entity may determine whether to allocate each resource or symbol with both systematic and parity bits or only parity bits based at least in part on the PRG or the DMRS location configurations. This may result in the constellation points or resource elements that consist of parity bits only, on the edge frequencies of each PRG or far from each DMRS. This enables the UE or network entity to overcome the low channel estimation accuracy by not allowing the affects to impact the systematic LLRs over the legacy approach. The interleaver may apply the rest of the parity bits and the systematic bits on the rest of the resources in other ways, such as protecting the systematic bits in the middle frequencies of each PRG or near each DMRS. In some examples, the rest of the parity bits and the systematic bits may be allocated to resources based on a legacy approach.

In an example, a first wireless device, such as a UE or network entity, may comprise one or more memories storing processor-executable code and one or more processors coupled with the one or more memories and individually or collectively operable to execute the code to cause the first wireless device to receive, from a second wireless device, first signaling indicating a size of a precoding resource block group and an offset parameter indicating an offset between the precoding resource block group and a codeblock. The code may also cause the first wireless device to transmit second signaling indicating a resource element starting parameter and a resource element ending parameter in at least one of a time domain and a frequency domain based at least in part on the size of the precoding resource block group. The code may also cause the first wireless device to communicate, with the second wireless device, a coded bit stream that is interleaved in accordance with at least one of the size of the precoding resource block group, the offset parameter, the resource element starting parameter, the resource element ending parameter, or any combination thereof.

In another example, a first wireless device, such as a UE or network entity, may comprise one or more memories storing processor-executable code and one or more processors coupled with the one or more memories and individually or collectively operable to execute the code to cause the first wireless device to transmit, to a second wireless device, first signaling indicating a size of a precoding resource block group and an offset parameter indicating an offset between the precoding resource block group and a codeblock. The code may also cause the first wireless device to receive second signaling indicating a resource element starting parameter and a resource element ending parameter in at least one of a time domain and a frequency domain based at least in part on the size of the precoding resource block group. The code may also cause the first wireless device to communicate, with the second wireless device, a coded bit stream that is interleaved in accordance with at least one of the size of the precoding resource block group, the offset parameter, the resource element starting parameter, the resource element ending parameter, or any combination thereof.

Embodiments described herein may pass the interleaver between the transmitter and receiver with low overhead. The systematic bits may be protected, and therefore more likely to be properly decoded, near the DMRS signals or in the middle of the frequency range of each resource block. This may lead to improved processing gain, improved user experience, reduced lag, reduced processing resources, and improved spectral efficiency.

Figure 2:
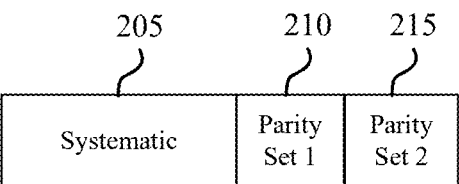
FIG. 2 shows an example of a block diagram that supports an interleaver adapted for channel estimation quality imbalances in accordance with one or more aspects of the present disclosure.

FIG. 2 shows an example of a block diagram 200 that supports an interleaver adapted for channel estimation quality imbalances in accordance with one or more aspects of the present disclosure. The block diagram 200 illustrates a bit stream that may be used or implemented by aspects of the wireless communications system 100. For example, the block diagram 200 may be implemented in a UE and a network entity 105 described with respect to FIG. 1.

The block diagram 200 includes systematic bits 205, a first set of parity bits 210, and a second set of parity bits 215. The first set of parity bits 210 and the second set of parity bits 215 may be formed out of a total number of parity bits. Parity bits may be error correcting bits used in the encoding scheme. The first set of parity bits 210 may be a first subset of the total number of parity bits and the second set of parity bits 215 may be a second subset of the total number of parity bits. The first set of parity bits 210 may not include any parity bits that are in the second set of parity bits 215, and the second set of parity bits 25 may not include any parity bits that are in the first set of parity bits 210.

The second set of parity bits 215 may be allocated to those areas of the PRG where they are more likely to suffer from poor channel estimation. For example, the second set of parity bits 215 may be allocated to the edges of a PRG, where the lower channel estimation processing gain is provided. In another example, the second set of parity bits 215 may be allocated to resources of the PRG far away from any demodulation reference signals, where the lower channel estimation processing gain is provided. In some examples, the second set of parity bits 215 may be allocated to only the edges of the PRG. In other examples, the second set of parity bits 215 may be allocated to only resources far from the DMRS. In other examples, the second set of parity bits 215 may be allocated to resources both at the edges of the PRG and far from the DMRS.

By allocating the second set of parity bits 215 as described, the systematic bits 205 may be allocated away from resource elements that have low channel estimation processing gain. Instead, the systematic bits 205 may be allocated to resource elements of the PRG that have higher channel estimation processing gain, such as in the middle of the PRG or near the DMRS resources. The first set of parity bits 210 may be allocated to the rest of the resources. The allocation of the systematic bits 205 and the first set of parity bits 210 may be performed according to legacy approaches.

The second set of parity bits 215 may be selected from all the parity bits by determining how many bits are needed at the edges of the PRG or far from the DMRS resources, and then selecting the second set of parity bits 215 to have enough parity bits to be allocated to all of those areas. For example, the second set of parity bits 215 may be selected in order to have enough parity bits allocated to the edges of the PRG and far from the DMRS. The first set of parity bits 210 may be the rest of the parity bits excluding the second set of parity bits 215.

Figure 3:
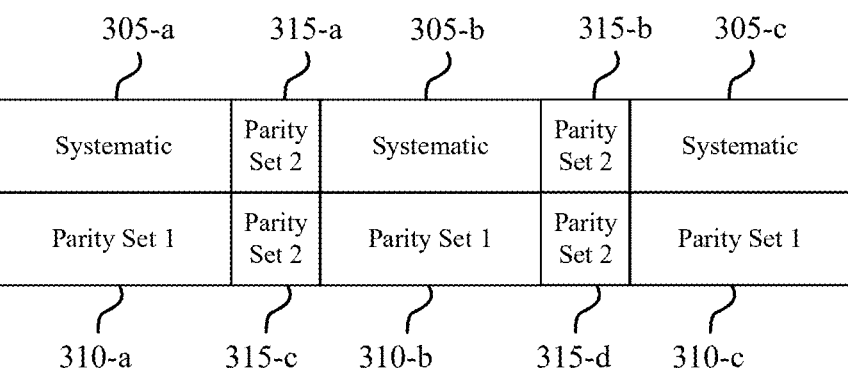
FIG. 3 shows an example of a block diagram that supports an interleaver adapted for channel estimation quality imbalances in accordance with one or more aspects of the present disclosure.

FIG. 3 shows an example of a block diagram 300 that supports an interleaver adapted for channel estimation quality imbalances in accordance with one or more aspects of the present disclosure. The block diagram 200 illustrates a bit stream that may be used or implemented by aspects of the wireless communications system 100. The bit stream may be encoded according to techniques described herein. For example, the block diagram 300 may be implemented in a UE and a network entity 105 described with respect to FIG. 1. The systematic bits and the first and second sets of parity bits may be aspects of those described with respect to FIG. 2.

Figure 4:
FIG. 4 shows an example of a graph that supports an interleaver adapted for channel estimation quality imbalances in accordance with one or more aspects of the present disclosure.
Figure 5:
FIG. 5 shows an example of a graph that supports an interleaver adapted for channel estimation quality imbalances in accordance with one or more aspects of the present disclosure.
Figure 5:
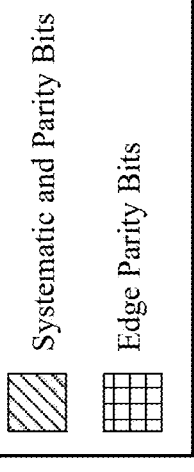

The block diagram 300 includes systematic bits, a first set of parity bits, and a second set of parity bits that are allocated to different resource elements. The systematic bits and the first set of parity bits may be allocated to resource elements 305-*a*, 305-*b*, and 305-*c*, and 310-*a*, 310-*b*, and 310-*c*, respectively. The second set of parity bits may be allocated to the edges of the PRGs or far from any DMRSs. The second set of parity bits may be allocated to resource elements 315-*a*, 315-*b*, 315-*c*, and 315-*d* (collectively referred to as resource elements 315). The resource elements 315 may be located at the edges of a PRG or far from any DMRSs. FIGS. 4 and 5 may illustrate the processing gains and losses depending for the resource elements within a PRG, and help to illustrate where the systematic and parity bits may be allocated to improve processing gains.

FIG. 4 shows an example of a graph 400 that supports an interleaver adapted for channel estimation quality imbalances in accordance with one or more aspects of the present disclosure. The graph 400 represents processing gain of channel estimation verses different PRG size over the frequency domain.

There are multiple possibilities for determining a precoding group size along the frequency domain. The PRG may be a parameter that describes the bandwidth partitioning of consecutive resource blocks. The graph 400 illustrates a plot of processing gain over subcarrier numbers for three possible PRG sizes. The PRG sizes include a PRG size of 2 resource blocks (curve 405), a PRG size of 4 resource blocks (curve 410), and a wideband of 54 resource blocks (line 415). In other examples, other PRG sizes may be used. The wideband of 54 resource blocks may be the entire allocation.

Since the network entity would like to track the channel of the UE, it may calculate the precoder parameters based on a CSI-RS. The PRG may impact the precoder calculation over the frequency domain, meaning the UE may assume that the same precoder applies on all scheduled PRBs within a PRG. Smaller PRG sizes (e.g., smaller number of consecutive RBs with the same precoder), may better track the frequency selective channel, but result in lower channel estimation processing gain. Larger PRG size (such as the wideband precoder) may degrade the frequency selective channel, but have good processing gain. Alternatively, there may be a lot of consecutive resource elements that are highly correlated so that the same precoder may be applied to them. Those resource elements may be highly correlated, so the channel is not that frequency selective. Thus, there is a tradeoff between channel estimation processing gain and PRG size that impacts the overall performance. The network may determine which PRG size to use to balance these considerations, or to select for a consideration that may be more important.

A first PRG 430-*a* and a second PRG 430-*b* for curve 405 are illustrated, wherein each PRG is a group of 4 resource blocks. Likewise, a single PRG 435 for curve 410 is illustrated, which is a group of 2 resource blocks. Within each PRG (e.g., PRG 430 and PRG 435), from top to bottom (e.g., curves 405 and 410, respectively), the UE can assume it has the same precoder. However, between PRGs, it is not guaranteed to have the same precoder. For example, the precoder for PRG 430-*a* may be different from the precoder for PRG 430-*b*. The precoders may be different because channel conditions may have changed, such as in a high Doppler spread situation. The precoders may differ between other consecutive PRGs as well.

Since the UE may assume that the same precoder applies on all scheduled PRBs within a PRG, channel estimation may be performed on the set of resource blocks within the same PRG, such as the middle 420. Since this is the same precoder for the middle 420, the UE can combine and get some persistent gain. However, applying the same precoder to the edges 425 of the resource elements within a PRG may be compromised with low channel estimation processing gain. At the edges 425, there are only a small number of resource elements for the channel estimation, so the processing gain reduces. This may result in a pattern similar to that in the graph 400, which shows large variation in processing gain along the subcarrier axis. At the edges 425 of each PRG, the UE may suffer from low processing gain, and in the middle 420, the UE gains a lot of processing gain. For example, there may be a 6 decibel (dB) to 10 dB difference in processing gain between the resource elements in the middle 420 and the resource elements at the edges 425 within a PRG, based on the different precoding on the transmitter side (e.g., the network side).

Turning back to FIG. 3, the bit stream has been organized to avoid placing the systematic bits in the areas where the processing gains are low. The resource elements 305-*a*, 305-*b*, and 305-*c*, and 310-*a*, 310-*b*, and 310-*c*, correspond to the middle region of the PRG, such as middle 420 of FIG. 4. The resource elements 315 correspond to the edges of the PRG, such as edges 425 of FIG. 4. The second set of parity bits may be placed at the edges of the PRG.

FIG. 5 shows an example of a graph 500 that supports an interleaver adapted for channel estimation quality imbalances in accordance with one or more aspects of the present disclosure. The graph 500 may represent the processing gain of channel estimation verses subcarriers over the frequency domain for a particular PRG size. systematic bits and parity bits are overlaid onto the graph 500 to illustrate where the bits would be located within a PRG in terms of processing gain. Thus, FIG. 5 illustrates where each type of bit may be located from the perspective of a processing gain curve 505. The processing gain curve 505 may be similar to, or represent aspects of, the curves 405 and 410 of FIG. 4.

Each PRG illustrated by the processing gain curve 505 may include two edges 510, a first edge 510-*a* and a second edge 510-*b*, and a middle 515. The second set of parity bits may comprise edge parity bits within the edges 510. The second set of parity bits, or edge parity bits, are located on the edges 510 of the PRG, such that the edge parity bits are the bits that are subjected to the low processing gain. The systematic bits and the rest of the parity bits not on the edges (e.g., the first set of parity bits) may be allocated to the middle 515. The resource elements in the middle 515 of the PRG have higher processing gain, thus prioritizing the systematic bits over the parity bits.

The organization of the systematic and parity bits in this manner help the UE to overcome the low channel estimation accuracy at the edges by not impacting the systematic LLRs. Low-capacity resource elements that suffer from low processing gain will be mapped to parity only bits (constellation points), thus keeping the systematic bits (or the systematic plus the rest of the parity bits) with better processing gain.

Turning back to FIG. 3, the bit stream may place the systematic bits at resource elements 305-*a* and the first set of parity bits at 310-*a*, which may correspond to a middle region of a first PRG. The second set of parity bits at resource elements 315-*a* and 315-*c* may correspond to an edge region of the first PRG and a second, consecutive PRG.

The systematic bits at resource elements 305-*b* and the first set of parity bits at 310-*b* may correspond to a middle region of the second PRG. The second set of parity bits at resource elements 315-*b* and 315-*d* may correspond to an edge region of the second PRG and a third, consecutive PRG. The systematic bits at resource elements 305-*c* and the first set of parity bits at 310-*c* may correspond to a middle region of the third PRG.

In the various examples, more or fewer parity bits may be used at the edges of the PRG or far from the DMRS. In some examples, a "thicker" amount of parity bits may be used to fill in the edges of the PRG or far from the DMRS, meaning more parity bits are allocated to the edges or far from the DMRS. In other examples, fewer parity bits may be allocated to the edges or far from the DMRS.

The bit stream shown in block diagram 300 may be encoded according to the mapping shown, which results in improved processing gains for the systematic bits. The improved processing gains may improve user experience, improve spectral efficiency, reduce decoding errors, and may reduce processing power.

Figure 6:
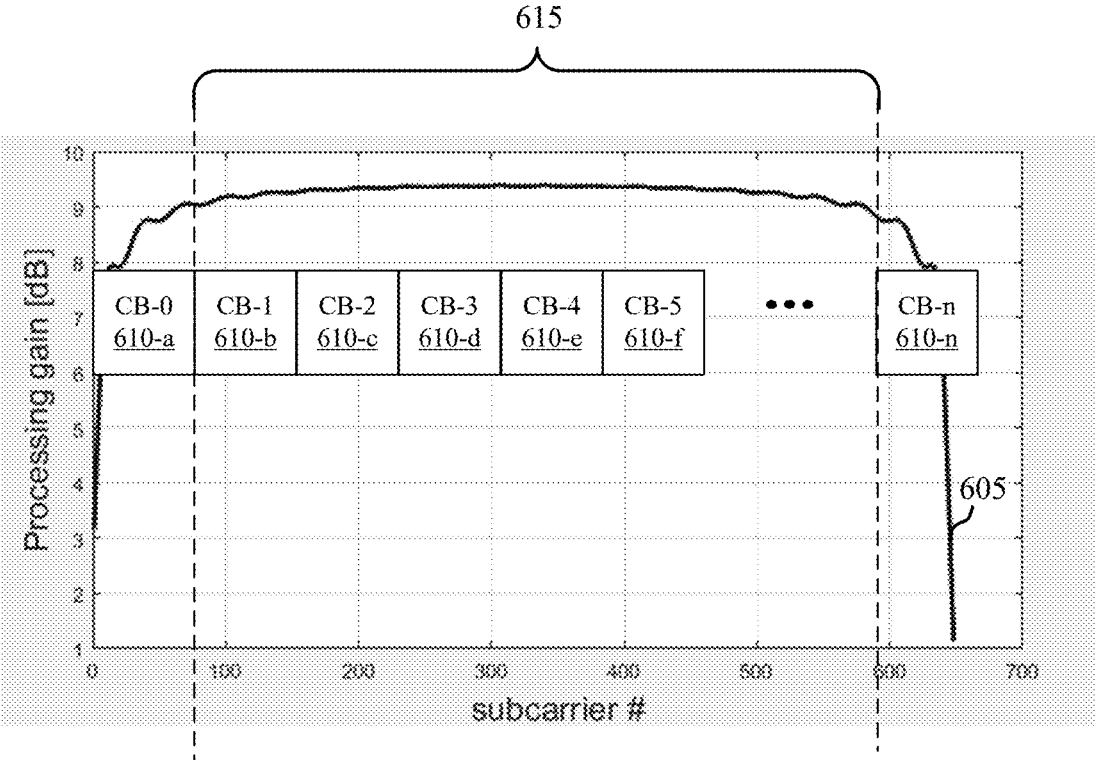
FIG. 6 shows an example of a graph that supports an interleaver adapted for channel estimation quality imbalances in accordance with one or more aspects of the present disclosure.

FIG. 6 shows an example of a graph 600 that supports an interleaver adapted for channel estimation quality imbalances in accordance with one or more aspects of the present disclosure. The graph 600 may represent the processing gain of channel estimation verses subcarriers over the frequency domain for a wideband via processing gain curve 605, with codeblocks imposed on the graph 600. The processing gain curve 605 may be similar to, or represent aspects of, the curves 405 and 410 of FIG. 4 and the processing gain curve 505 of FIG. 5.

Techniques described herein may differ based on the relation between the codeblock size and the PRG size. FIG. 5 illustrates an example where the PRG size is much greater than the codeblock size. The graph 600 shows a plurality of codeblocks, codeblock 610-*a* through 610-*n* (collectively referred to as codeblocks 610).

In a middle 615 of the PRG, the processing gains may be about the same, so the UE can apply the same precoders to all of the codeblocks that are within this range. For example, the UE may apply the same precoder to codeblocks 610-*b* through a codeblock before 610-*n*. But at the edges of the PRG, the codeblock may be broken down and the method of interleaving described herein may be used. For example, the techniques described herein may be used for codeblocks 610-*a* and 610-*n*.

Since the input to the LDPC must be de-interleaved and applied accordingly with the codeblock LLRs, the relation between the codeblock size and the PRG size may be considered. For example, if the size of the PRG is greater than or equal to the codeblock size, then the legacy interleaver may be used. However, if the PRG size is less than the codeblock size or the codeblock is on a PRG edge, then the PRB based interleaver described herein may be used. However, in some examples, the PRB based interleaver may be used for all codeblocks, regardless of the relation between the codeblock size and the PRG size.

If the PRG size is less than the codeblock size, or the codeblock is on a PRG edge, then the techniques described herein may be applied to interleave the bitstream. The legacy interleaver may spread the constellation points that consist of both systematic and parity bits randomly, regardless of the PRG. For the legacy interleaver, each constellation point that is transmitted consists of both systematic and parity bits, which exposes some of the systematic bits to low channel estimation processing gain.

Using the PRG based interleaver described herein, the constellation points may concentrate the parity bits around the subcarriers at the PRG edges. The other constellation points that are not subject to such low channel estimation processing gain as the edges may include systematic bits and parity bits. Thus, the PRG edges impacts only the parity bits and keeps the systematic and the rest of the parity bits with good channel estimation processing gain. Thus, the second set of parity bits may be allocated to regions with low quality subcarriers so that those subcarriers are only impacting the second set of parity bits, which keeps the systematic bits intact in the subcarriers with better transmission quality.

The concepts described with respect to FIGS. 3-6 illustrate the frequency domain. However, the concepts may be applied to the time domain as well. The edges of the PRG described with respect to the frequency domain may correspond to those symbols far from the DMRS, while the middle of the PRG descried respect to the frequency domain may correspond to those symbols near the DMRS.

Figure 7:
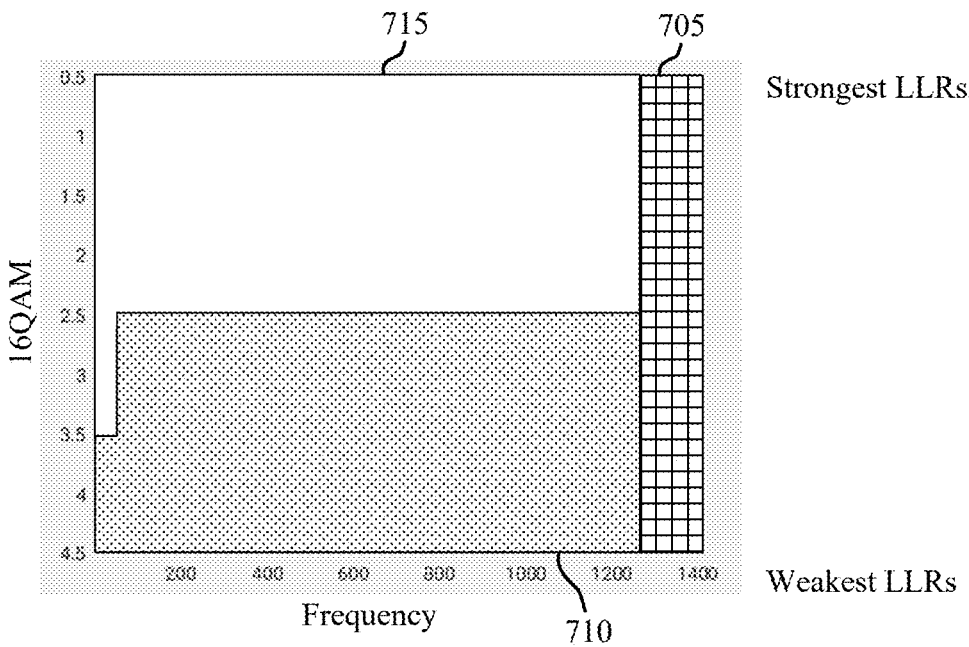
FIG. 7 shows an example of a diagram that supports an interleaver adapted for channel estimation quality imbalances in accordance with one or more aspects of the present disclosure.

FIG. 7 shows an example of a diagram 700 that supports an interleaver adapted for channel estimation quality imbalances in accordance with one or more aspects of the present disclosure. The diagram 700 illustrates a codeblock with parity and systematic bits for a modulation scheme over frequency according to the interleaving techniques described herein. The diagram 700 may be implemented in a UE and a network entity 105 described with respect to FIG. 1. The systematic bits and the first and second sets of parity bits may be aspects of those described with respect to FIGS. 7-6.

The modulation scheme illustrated in FIG. 7 is a 16 quadrature amplitude modulation (QAM) scheme, which may modulate an amplitude, phase, or other attribute of a waveform for an uplink or downlink signal to indicate different bits of information. In some examples, a quadrature (e.g., based on two waveforms that are 90 degrees out of phase and are added to generate a waveform) modulation scheme may be defined by a constellation of points in an IQ plot according to an In-Phase (I) axis and a Quadrature (Q) axis. In other examples, other modulation schemes may be used, such as quadrature phase-shift keying (QPSK), binary phase-shift keying (BPSK), pulse amplitude modulation (PAM), among other modulation schemes.

Some frequencies will contain constellation points where all LLRs are from a parity bit set. For example, the constellation points in section 705 are composed of only edge parity bits, and those cancellation points may be subject to low channel estimation processing gain. The rest of the codeblock may be interleaved according to legacy interleaving techniques, wherein each constellation point may consist of the systematic bits on strongest LLRs 715 and parity bits on weakest LLRs 710. The techniques described herein protect the systematic bits that would have been placed at the strongest LLRs at the edge, where the second set of parity bits are now located.

Figure 8:
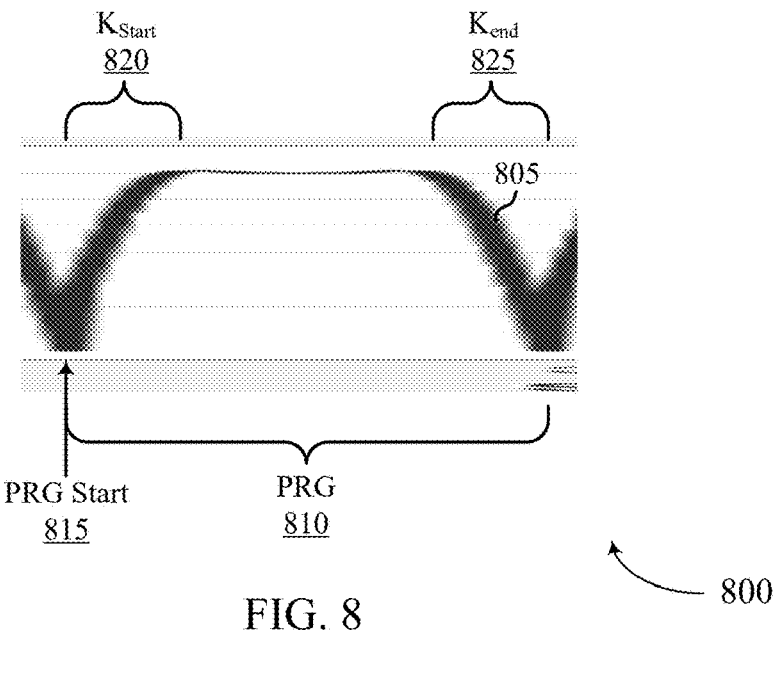
FIG. 8 shows an example of a graph segment that supports an interleaver adapted for channel estimation quality imbalances in accordance with one or more aspects of the present disclosure.

FIG. 8 shows an example of a graph segment 800 that supports an interleaver adapted for channel estimation quality imbalances in accordance with one or more aspects of the present disclosure. The graph segment 800 may represent the processing gain of channel estimation over the frequency domain or time domain. The processing gain curve 805 may be similar to, or represent aspects of, the curves 405 and 410 of FIG. 4, the processing gain curve 505 of FIG. 5, and the processing gain curve 605 of FIG. 6.

The graph segment 800 represents a PRG 810, which begins at start 815. The PRG has a first number of PRGs at the beginning of the PRG, $K_{start}$ 820. The PRG has a second number of PRGs at the ending of the PRG, $K_{end}$ 825.

The PRG based interleaver may break the parity bits up into two sets, and applies the second set of parity bits to the beginning and end of the PRG 810. This covers the edges of the PRG 810 from both sides. The second set of parity bits may be spread based on number of resource elements at the start and end of the PRG 810 by parameters $K_{start}$ and $K_{end}$. These parameters may be defined by thresholds of the post processing signal-to-noise ratio (SNR), $Th_{PRG,start}$ and $Th_{PRG,end}$. The thresholds $Th_{PRG,start}$ and $Th_{PRG,end}$ may be defined as a threshold of the channel estimation processing gain. Those resource elements with channel estimation processing gains below the threshold may be too low for the systematic bits to maintain the desired channel quality. Therefore, a value K may be defined as a number of resource elements that have channel estimation processing gains below the threshold. Therefore, there may be the $K_{start}$ 820 and the $K_{end}$ 825 that corresponds to the resource elements at the edges of the PRG 810.

The network may signal the $Th_{PRG,start}$ and $Th_{PRG,end}$ threshold values to the UE in any form of signaling, such as control signaling. In some examples, the UE may configure itself with the $Th_{PRG,start}$ and $Th_{PRG,end}$ threshold values. The UE may determine the $K_{start}$ 820 and the $K_{end}$ 825 based on the threshold values.

Figure 9:
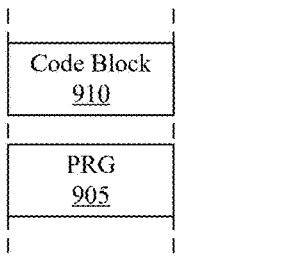
FIG. 9 shows an example of a block diagram that supports an interleaver adapted for channel estimation quality imbalances in accordance with one or more aspects of the present disclosure.
Figure 10:
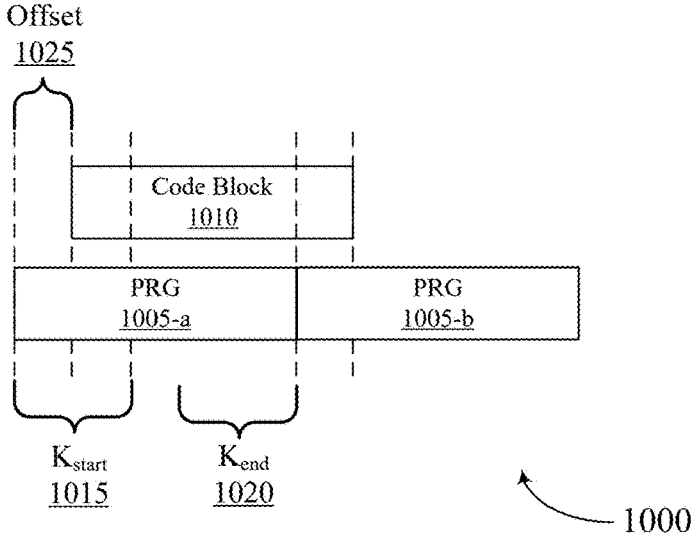
FIG. 10 shows an example of a block diagram that supports an interleaver adapted for channel estimation quality imbalances in accordance with one or more aspects of the present disclosure.

In some examples, there may be a difference in resource elements of the relation between a codeblock to a PRG. A parameter may be used to demonstrate the difference. The parameter may be an offset parameter, and may be referred to as CB-PRG-Offset. FIGS. 9 and 10 illustrate examples for the offset parameter.

FIG. 9 shows an example of a block diagram 900 that supports an interleaver adapted for channel estimation quality imbalances in accordance with one or more aspects of the present disclosure. The block diagram includes a PRG 905 and a codeblock 910 that may be used or implemented by aspects of the wireless communications system 100. For example, the block diagram 900 may be implemented in a UE 115 and a network entity 105 as described with respect to FIG. 1.

The block diagram 900 illustrates an example where there is no offset between the PRG 905 and the codeblock 910. If a size of the codeblock 910 is perfectly aligned with a size of the PRG 905, within the higher processing gain values, the offset between the two will be 0. In some examples, CB-PRG-Offset may have a value that indicates no offset (e.g., a null value, or 0). In other examples, CB-PRG-Offset may not be present when there is no offset. In this example, $K_{start}=K_{end}=4$ resource elements, so CB-PRG-Offset=0. Thus, the codeblock 910 starts at the beginning of the PRG 905. Thus, the second set of parity bits is broken into two equal parts and mapped to four resource from both sides.

FIG. 10 shows an example of a block diagram 1000 that supports an interleaver adapted for channel estimation quality imbalances in accordance with one or more aspects of the present disclosure. The block diagram 1000 includes a first PRG 1005-*a*, a second PRG 1005-*b*, and a codeblock 1010 that may be used or implemented by aspects of the wireless communications system 100. For example, the block diagram 900 may be implemented in a UE 115 and a network entity 105 as described with respect to FIG. 1.

The block diagram 1000 illustrates an example where there is an offset between the PRG 1005-*a* and the codeblock 1010. In this example, the codeblock 1010 is shifted with respect to the PRG 1005-*a*, so that the codeblock 1010 overlaps two PRGs: PRG 1005-*a* and PRG 1005-*b*. In this example, the UE defines $K_{start}$ 1015 and $K_{end}$ 1020 for 4 subcarriers for the beginning and the end of the PRG 1005-*a*. Because of these values, an offset 1025 may be defined as 2, because 2 is the difference between $K_{start}$ 1015 and $K_{end}$ 1020. The codeblock 1010 is shifted by two carriers to the left with respect to the PRG 1005-*a*. Thus, the left edge has 2 resource elements, and the right edge has 6 resource elements that are below the threshold. The left side has two resource elements related to the PRG 1005-*a* and on the right side, 2 of them are related to the PRG 1005-*a* and 4 of them are related to the PRG 1005-*b*.

In this example, $K_{start}=K_{end}=4$ resource elements, and CB-PRG-Offset=2. Thus, the codeblock 1010 starts after the beginning of the PRG 1000-*a*. Thus, the second set of parity bits is broken into a first part, where on the left side there will be parity bits only on two resource elements, and on the right side there will be parity bits only on six resource elements.

If a size of the codeblock 910 is perfectly aligned with a size of the PRG 905, within the higher processing gain values, the offset between the two will be 0. In some examples, CB-PRG-Offset may have a value that indicates no offset (e.g., a null value, or 0). In other examples, CB-PRG-Offset may not be present when there is no offset.

Examples described herein have mostly illustrated the frequency domain channel quality imbalances, but there may also be time domain channel quality imbalances among symbols. The time domain imbalances may be based on Doppler spread and the velocity of the channel. Symbols that are far from a DMRS may suffer from low channel estimation processing gain due to the time duration interpolation (TDI) channel estimation. There may be a trade-off with high velocity, such that high velocity may map large number of DMRS symbols. Likewise, low velocity may map low numbers of DMRS symbols.

Symbols that are closer to the DMRS will experience higher time correlation, thus the channel estimation is more suitable for this symbol decoding. A parameter may be defined that demonstrates the difference in symbols of a codeblock to the DMRS. This is similar to the approach for the PRG, but spanned over the time domain with respect to the DMRS symbols. The parameter may be Time-Symbol-Offset, and it may indicate an offset in the time domain. Additional parameters $T_{start}$ and $T_{end}$ may be defined along the time axis, which can be defined by thresholds $Th_{Time,start}$ and $Th_{Time,end}$, similar to the frequency domain case. Overall, subcarriers that are located with the following parameters (Middle of PRG and Closer to DMRS) (within the middle of the PRG and closer to the DMRS) will experience higher processing gain (thus it is desirable to pack the systematic bits here) versus symbols that are at the edge of the PRG and far from the DMRS, based on the thresholds (Edge of PRG and Far of DMRS). Thus, performance will be increased by placing only the parity bits in subcarriers with the less reliable conditions.

Figure 11:
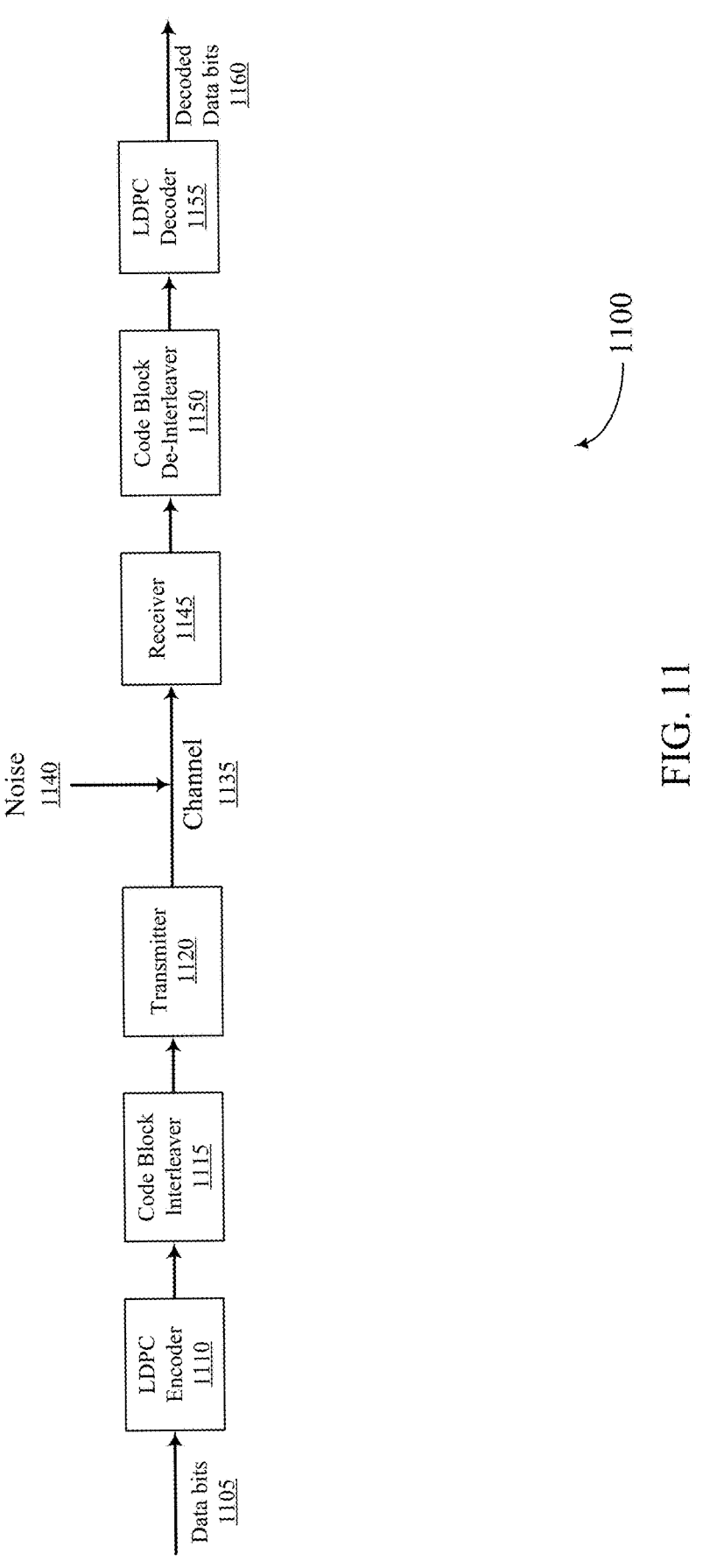
FIG. 11 shows an example of a block diagram that supports an interleaver adapted for channel estimation quality imbalances in accordance with one or more aspects of the present disclosure.

FIG. 11 shows an example of a block diagram 1100 that supports an interleaver adapted for channel estimation quality imbalances in accordance with one or more aspects of the present disclosure. The block diagram 1100 shows an interleaver and a de-interleaver that may be used or implemented by aspects of the wireless communications system 100. For example, the block diagram 1100 may be implemented in a UE 115 and a network entity 105 as described with respect to FIG. 1.

The block diagram 1100 shows an example of data bits 1105 being interleaved on a transmitter side and de-interleaved on a receiver side. The transmitter side may be a UE or a network entity, and the de-interleaver may be a network entity or a UE. In some examples, both the transmitter and receiver sides are UEs or network entities.

On the transmitter side, the block diagram 1100 includes an LDPC encoder 1110, a codeblock interleaver 1115, and a transmitter 1120. A stream of data bits 1105 is input to the LDPC encoder 1110, which encodes the data bits 1105. The encoded data bits are input to the codeblock interleaver 1115, which interleaves the codeblocks according to techniques described herein. The codeblock interleaver 1115 may put parity bits only on the edges of codeblocks that may be subject to low channel estimation processing gain, and protect the systematic bits in portions of the codeblocks that have high channel estimation processing gains. The interleaved encoded bit stream is input to the transmitter 1120, which transmits the interleaved encoded bit stream over the channel 1135.

Noise 1140 may affect channel 1135, as well as potential other factors, such as high Doppler spread. The interleaving performed by the codeblock interleaver 1115 may protect the more important systematic bits from any deleterious channel conditions and noise 1140.

On the receiver side, the block diagram 1100 includes a receiver 1145, a codeblock de-interleaver 1150, and a LDPC decoder 1155. The receiver 1145 may receive the interleaved encoded bit stream, and provide it to the codeblock de-interleaver 1150. The codeblock de-interleaver 1150 may de-interleave the interleaved encoded bit stream according to techniques described herein. The codeblock de-interleaver 1150 may be configured with relevant thresholds and offsets to properly de-interleave the interleaved encoded bit stream. Once the interleaved encoded bit stream has been de-interleaved, it is provided to the LDPC decoder 1155, which decodes the encoded bit stream. The resultant decoded data bits 1160 may be passed on to other components of the UE or the network entity, such as one or more processing units or filters.

Figure 12:
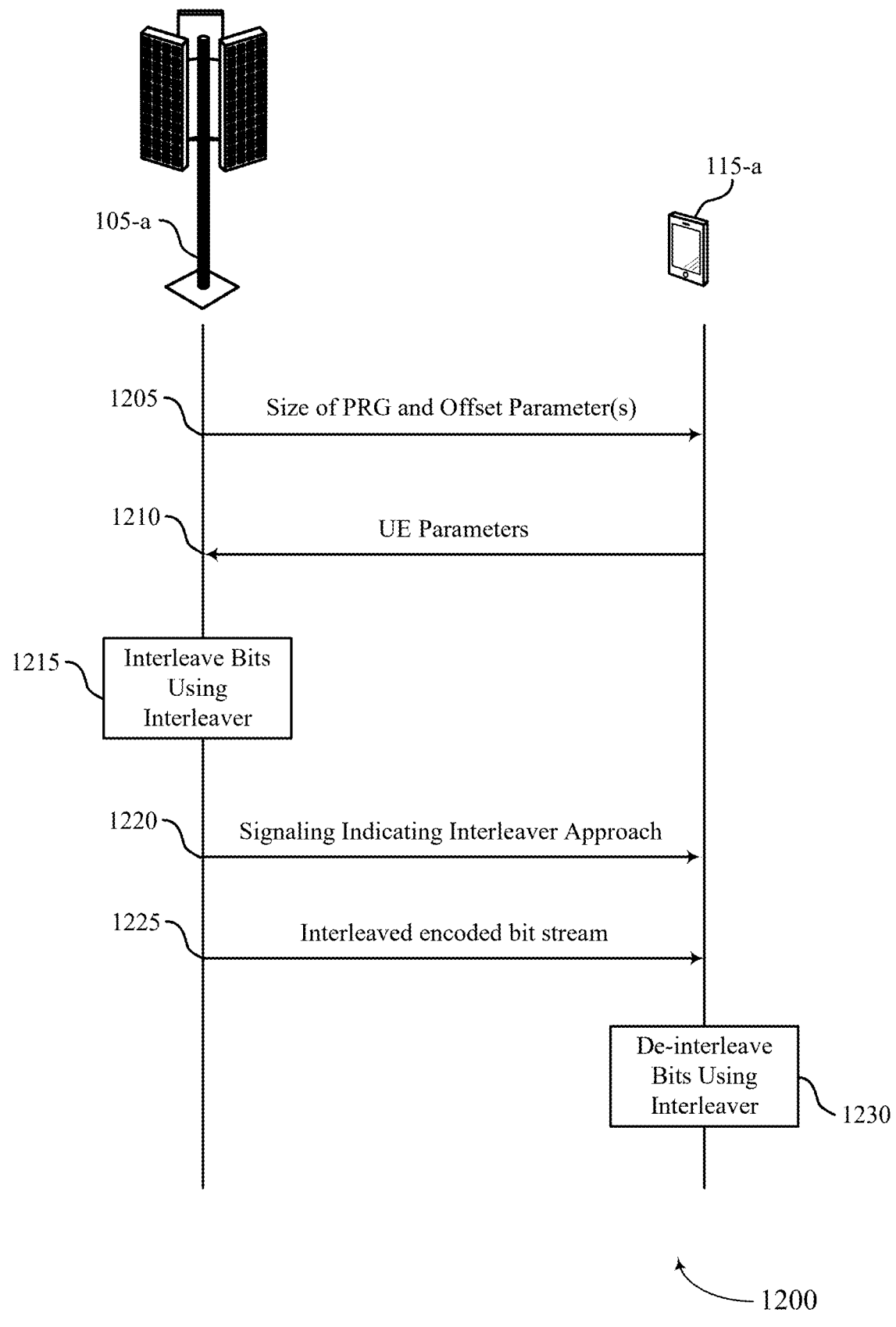
FIG. 12 shows an example of a process flow that supports an interleaver adapted for channel estimation quality imbalances in accordance with one or more aspects of the present disclosure.

FIG. 12 shows an example of a process flow 1200 that supports an interleaver adapted for channel estimation quality imbalances in accordance with one or more aspects of the present disclosure. The process flow 1200 may implement aspects of or may be implemented by aspects of the wireless communications system 100. For example, the process flow 1200 may include a UE 115-a and a network entity 105-a, which may be an example of a UE 115 and a network entity 105 as described herein. In the following description of the process flow 1200, the operations performed by the UE 115-a and the network entity 105-a may be performed in different orders or at different times than the exemplary order shown. Some operations may also be omitted from the process flow 1200, or other operations may be added to the process flow 1200. Further, while operations in the process flow 1200 are illustrated as being performed by the UE 115-a and the network entity 105-a, the examples herein are not to be construed as limiting, as the described features may be associated with any quantity of different devices. Although the following discussions describe the UE 115-a as operating as a transmitter that modulates and transmits the modulated message, the techniques described herein may apply to the network entity 105-a operating as the transmitter and the UE 115-a operating as the receiver. For example, the techniques described herein may apply to uplink communications between the UE 115-a and the network entity 105-a, downlink communications between the network entity 105-a and the UE 115-a, sidelink communications between UEs 115 (e.g., UE 115 to UE 115), or backhaul communications between network entities 105 (e.g., network entity 105 to network entity 105).

Both CB and PRG locations may be known to the transmitter and receiver (e.g., UE and network entity) so there is a deterministic alignment of PRG versus CB that may be indicated via signaling. A network entity may be informed UE capabilities and $K_{start}$, $K_{end}$, $T_{start}$, $T_{end}$ from channel estimation per PRG size, as well as parameters regarding Time Domain post processing SNR (PPSNR). Thus, by defining thresholds $Th_{PRG,start}$, $Th_{PRG,end}$, $Th_{Time,start}$, $Th_{Time,end}$ of the Post Processing SNR sent to UE, those parameters may be set and applied for Frequency PRG and Time Domain DMRS channel estimation (CHEST).

In some examples, communications may be established between the network entity 105-a and the UE 115-a. At 1205, the network entity 105-a may transmit one or more parameters to the UE 115-a. The one or more parameters may include a size of the PRG, offset parameters, and any post processing SNR thresholds to configure the UE. In other examples, additional parameters may be sent at 1205. From the parameters, the UE 115-a may determine the $K_{start}$ and $K_{end}$ parameters, which are based on the PRG size. The codeblock and the PRG locations may be known to both the network entity 105-a and the UE 115-a, which may be determined prior to transmission. However, an alignment of the PRG and the codeblocks may be signaled between the network entity 105-a and the UE 115-a.

At 1210, the UE 115-a may transmit one or more UE capabilities to the network entity 105-a, including that it supports the interleaving techniques described herein. The UE 115-a may transmit $K_{start}$, $K_{end}$, $T_{start}$, and $T_{end}$ from the channel estimation per PRG size, as well as parameters regarding time domain channel estimation post processing SNR (PPSNR). Thus, by defining the thresholds $Th_{PRG,start}$, $Th_{PRG,end}$, $Th_{Time,start}$, and $Th_{Time,end}$ of the post processing SNR (e.g., the frequency and time domain channel estimation) sent to UE, those parameters may be set and signaled for both sides. The thresholds $Th_{PRG,start}$, $Th_{PRG,end}$, $Th_{Time,start}$, and $Th_{Time,end}$ may be pre-defined or shared within RRC/DCI/UCI based on channel conditions.

The signaling for the interleaver may be updated throughout communications. For example, the signaling may be updated statically, dynamically with a channel change, or periodically. The signaling may be performed both on the uplink and on the downlink.

The signaling at 1205 and 1210 may be within radio resource control (RRC), downlink control information, or uplink control information. For example, the offset parameters CB-PRG-Offset and Time-Symbols-Offset parameter for each codeblock can be shared within downlink control information or uplink control information.

Thus, the UE 115-a may pass the capabilities and parameters to the network entity 105-a. The network entity 105-a may inform the UE 115-a of the PRG size and the thresholds for post processing SNR. The UE 115-a may inform the network entity 105-a of the values of $K_{start}$, $K_{end}$, $T_{start}$, and $T_{end}$ per PRG, for the frequency and time domain approaches.

The network entity 105-a may interleave an encoded bit stream at 1215 using the interleaver techniques described herein, according to the signaled parameters. For example, the network entity 105-a may perform the frequency and time based optimized interleaving using the calculation of the offsets for the frequency and time. At 1220, the network entity 105-a may inform the UE 115-a of the signaling related to the PRG based optimized interleaver approach within the DCI. For each codeblock, the network entity 105-a may calculate CB-PRG-Offset and Time-Symbols-Offset, and assign the relevant Interleaver approach. The network entity 105-*a* may transmit the interleaved encoded bit stream to the UE 115-*a* at 1225.

The UE 115-*a* receives the interleaved encoded bit stream and de-interleaves it at 1230 according to the parameters and the offsets for the frequency and time. Through this interleaving process, the channel estimation quality imbalances are exploited to improve the interleaver such that more important systematic bits are protected from low channel estimation processing gain by the strategic placement of parity bits.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Figure 13:
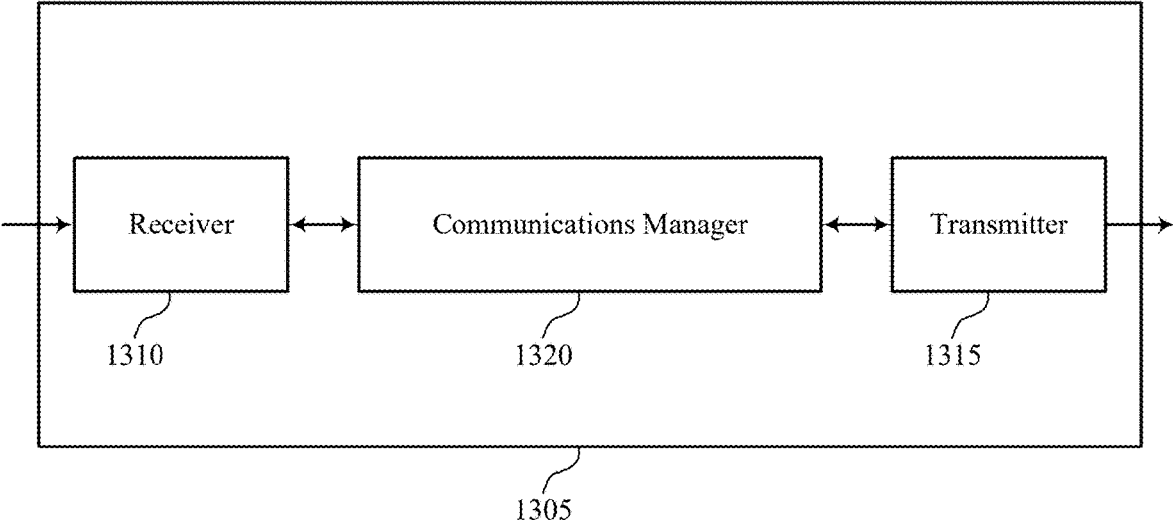
FIGS. 13 and 14 show block diagrams of devices that support interleaver adapted for channel estimation quality imbalances in accordance with one or more aspects of the present disclosure.

FIG. 13 shows a block diagram 1300 of a device 1305 that supports an interleaver adapted for channel estimation quality imbalances in accordance with one or more aspects of the present disclosure. The device 1305 may be an example of aspects of a UE 115 as described herein. The device 1305 may include a receiver 1310, a transmitter 1315, and a communications manager 1320. The device 1305, or one or more components of the device 1305 (e.g., the receiver 1310, the transmitter 1315, the communications manager 1320), may include at least one processor, which may be coupled with at least one memory, to, individually or collectively, support or enable the described techniques. Each of these components may be in communication with one another (e.g., via one or more buses).

The receiver 1310 may provide a means for receiving information such as packets, user data, control information, or any combination thereof associated with various information channels (e.g., control channels, data channels, information channels related to an interleaver adapted for channel estimation quality imbalances). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to an interleaver adapted for channel estimation quality imbalances). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations or components thereof may be examples of means for performing various aspects of interleaver adapted for channel estimation quality imbalances as described herein. For example, the communications manager 1320, the receiver 1310, the transmitter 1315, or various combinations or components thereof may be capable of performing one or more of the functions described herein.

In some examples, the communications manager 1320, the receiver 1310, the transmitter 1315, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1320, the receiver 1310, the transmitter 1315, or various combinations or components thereof may be implemented in code (e.g., as communications management software or firmware) executed by at least one processor (e.g., referred to as a processor-executable code). If implemented in code executed by at least one processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. For example, the communications manager 1320 is capable of, configured to, or operable to support a means for receiving, from a second wireless device, first signaling indicating a size of a precoding resource block group and an offset parameter indicating an offset between the precoding resource block group and a codeblock. The communications manager 1320 is capable of, configured to, or operable to support a means for transmitting second signaling indicating a resource element starting parameter and a resource element ending parameter in at least one of a time domain and a frequency domain based on the size of the precoding resource block group. The communications manager 1320 is capable of, configured to, or operable to support a means for communicating, with the second wireless device, a coded bit stream that is interleaved in accordance with at least one of the size of the precoding resource block group, the offset parameter, the resource element starting parameter, the resource element ending parameter, or any combination thereof.

By including or configuring the communications manager 1320 in accordance with examples as described herein, the device 1305 (e.g., at least one processor controlling or otherwise coupled with the receiver 1310, the transmitter 1315, the communications manager 1320, or a combination thereof) may support techniques for reduced processing, reduced power consumption, and more efficient utilization of communication resources.

Figure 14:
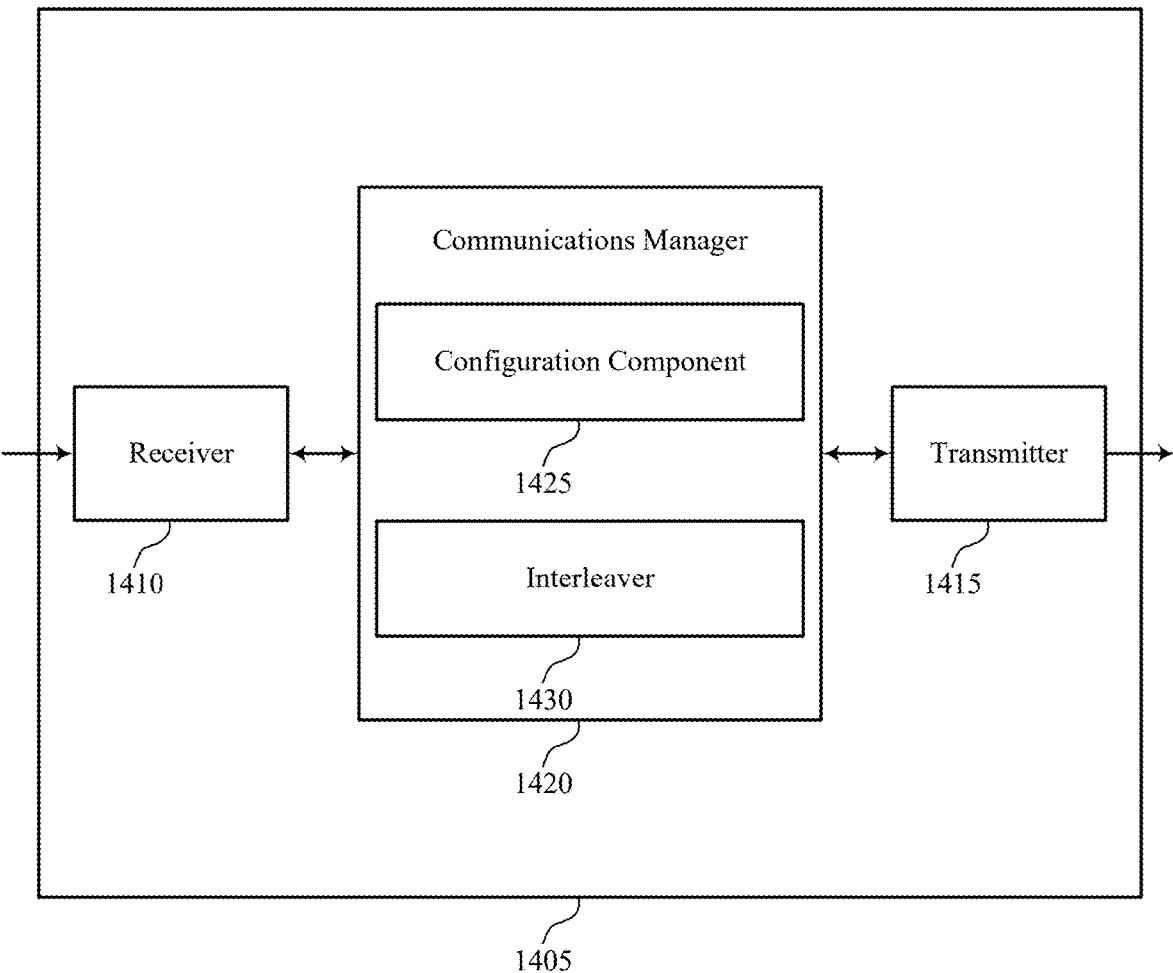

FIG. 14 shows a block diagram 1400 of a device 1405 that supports an interleaver adapted for channel estimation quality imbalances in accordance with one or more aspects of the present disclosure. The device 1405 may be an example of aspects of a device 1305 or a UE 115 as described herein. The device 1405 may include a receiver 1410, a transmitter 1415, and a communications manager 1420. The device 1405, or one of more components of the device 1405 (e.g., the receiver 1410, the transmitter 1415, the communications manager 1420), may include at least one processor, which may be coupled with at least one memory, to support the described techniques. Each of these components may be in communication with one another (e.g., via one or more buses).

The receiver 1410 may provide a means for receiving information such as packets, user data, control information, or any combination thereof associated with various information channels (e.g., control channels, data channels, information channels related to an interleaver adapted for channel estimation quality imbalances). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to an interleaver adapted for channel estimation quality imbalances). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of interleaver adapted for channel estimation quality imbalances as described herein. For example, the communications manager 1420 may include a configuration component 1425 an interleaver 1430, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications in accordance with examples as disclosed herein. The configuration component 1425 is capable of, configured to, or operable to support a means for receiving, from a second wireless device, first signaling indicating a size of a precoding resource block group and an offset parameter indicating an offset between the precoding resource block group and a codeblock. The configuration component 1425 is capable of, configured to, or operable to support a means for transmitting second signaling indicating a resource element starting parameter and a resource element ending parameter in at least one of a time domain and a frequency domain based on the size of the precoding resource block group. The interleaver 1430 is capable of, configured to, or operable to support a means for communicating, with the second wireless device, a coded bit stream that is interleaved in accordance with at least one of the size of the precoding resource block group, the offset parameter, the resource element starting parameter, the resource element ending parameter, or any combination thereof.

Figure 15:
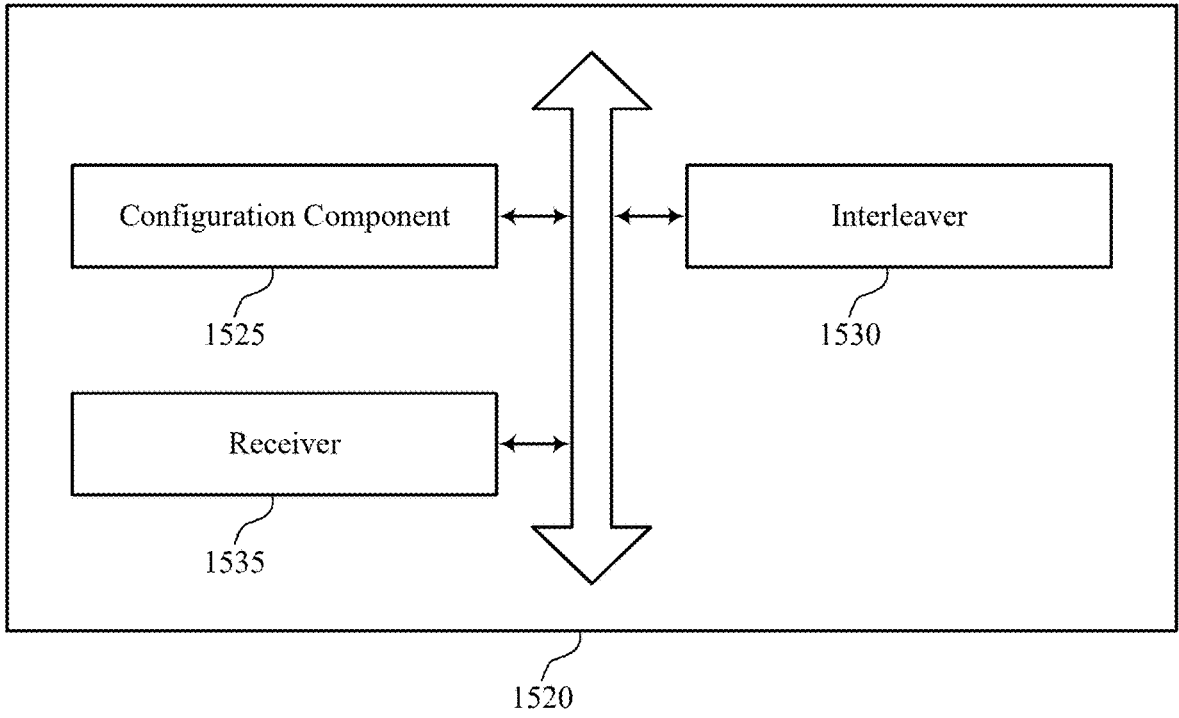
FIG. 15 shows a block diagram of a communications manager that supports an interleaver adapted for channel estimation quality imbalances in accordance with one or more aspects of the present disclosure.

FIG. 15 shows a block diagram 1500 of a communications manager 1520 that supports an interleaver adapted for channel estimation quality imbalances in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of interleaver adapted for channel estimation quality imbalances as described herein. For example, the communications manager 1520 may include a configuration component 1525, an interleaver 1530, a receiver 1535, or any combination thereof. Each of these components, or components or subcomponents thereof (e.g., one or more processors, one or more memories), may communicate, directly or indirectly, with one another (e.g., via one or more buses).

The communications manager 1520 may support wireless communications in accordance with examples as disclosed herein. The configuration component 1525 is capable of, configured to, or operable to support a means for receiving, from a second wireless device, first signaling indicating a size of a precoding resource block group and an offset parameter indicating an offset between the precoding resource block group and a codeblock. In some examples, the configuration component 1525 is capable of, configured to, or operable to support a means for transmitting second signaling indicating a resource element starting parameter and a resource element ending parameter in at least one of a time domain and a frequency domain based on the size of the precoding resource block group. The interleaver 1530 is capable of, configured to, or operable to support a means for communicating, with the second wireless device, a coded bit stream that is interleaved in accordance with at least one of the size of the precoding resource block group, the offset parameter, the resource element starting parameter, the resource element ending parameter, or any combination thereof.

In some examples, the first signaling further indicates whether the offset between the precoding resource block group and the codeblock is a vector in a frequency domain or a time domain. In some examples, the second signaling further indicates whether the resource element starting parameter and the resource element ending parameter are in the frequency domain or the time domain.

In some examples, to support communicating with the second wireless device, the receiver 1535 is capable of, configured to, or operable to support a means for receiving, from the second wireless device, the coded bit stream. In some examples, to support communicating with the second wireless device, the interleaver 1530 is capable of, configured to, or operable to support a means for decoding the coded bit stream based on the offset parameter, the resource element starting parameter, and the resource element ending parameter.

In some examples, to support decoding the coded bit stream, the interleaver 1530 is capable of, configured to, or operable to support a means for decoding the coded bit stream into a set of multiple resource elements, where a first set of the set of multiple resource elements includes parity bits and systematic bits, and where a second set of the set of multiple resource elements includes parity bits and no systematic bits.

In some examples, the coded bit stream includes a first set of parity bits located at a beginning of the precoding resource block group and at an ending of the precoding resource block group.

In some examples, the beginning of the precoding resource block group and the ending of the precoding resource block group are based on at least one processing gain threshold.

In some examples, the first signaling is received via a first radio resource control message, first downlink control information, or first uplink control information. In some examples, the second signaling is received via a second radio resource control message, second downlink control information, or second uplink control information.

In some examples, the offset parameter is a resource element offset or a time-symbols offset.

In some examples, the precoding resource block group includes a set of resource precoding resource blocks which are consecutive in a frequency domain.

Figure 16:
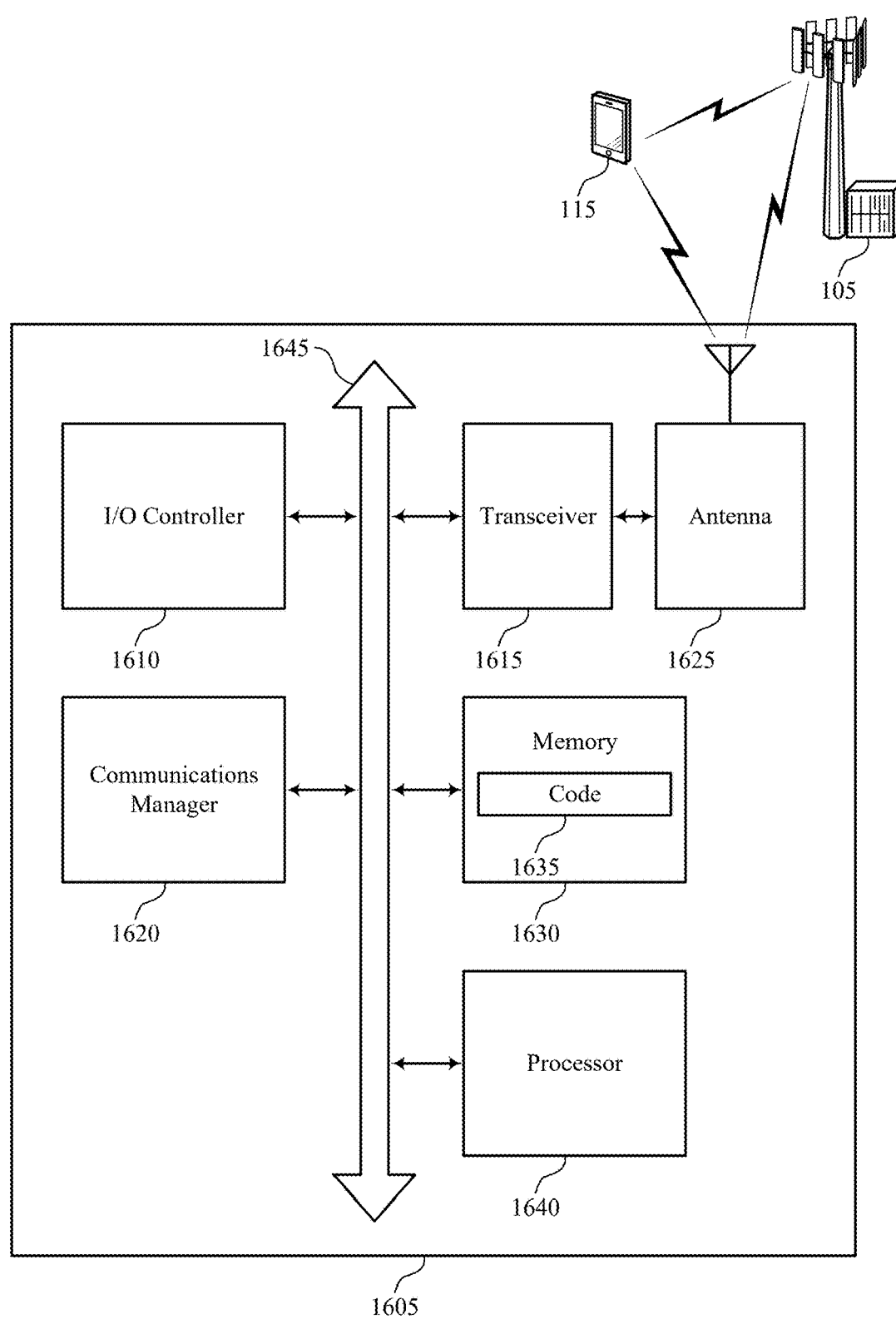
FIG. 16 shows a diagram of a system including a device that supports an interleaver adapted for channel estimation quality imbalances in accordance with one or more aspects of the present disclosure.

FIG. 16 shows a diagram of a system 1600 including a device 1605 that supports an interleaver adapted for channel estimation quality imbalances in accordance with one or more aspects of the present disclosure. The device 1605 may be an example of or include components of a device 1305, a device 1405, or a UE 115 as described herein. The device 1605 may communicate (e.g., wirelessly) with one or more other devices (e.g., network entities 105, UEs 115, or a combination thereof). The device 1605 may include components for bi-directional voice and data communications including components for transmitting and receiving communications, such as a communications manager 1620, an input/output (I/O) controller, such as an I/O controller 1610, a transceiver 1615, one or more antennas 1625, at least one memory 1630, code 1635, and at least one processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally, or alternatively, the I/O controller 1610 may represent or interact with a modem, a keyboard, a mouse, a touchscreen, or a similar device. In some cases, the I/O controller 1610 may be implemented as part of one or more processors, such as the at least one processor 1640. In some cases, a user may interact with the device 1605 via the I/O controller 1610 or via hardware components controlled by the I/O controller 1610.

In some cases, the device 1605 may include a single antenna. However, in some other cases, the device 1605 may have more than one antenna, which may be capable of concurrently transmitting or receiving multiple wireless transmissions. The transceiver 1615 may communicate bi-directionally via the one or more antennas 1625 using wired or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625.

The transceiver 1615, or the transceiver 1615 and one or more antennas 1625, may be an example of a transmitter 1315, a transmitter 1415, a receiver 1310, a receiver 1410, or any combination thereof or component thereof, as described herein.

The at least one memory 1630 may include random access memory (RAM) and read-only memory (ROM). The at least one memory 1630 may store computer-readable, computer-executable, or processor-executable code, such as the code 1635. The code 1635 may include instructions that, when executed by the at least one processor 1640, cause the device 1605 to perform various functions described herein. The code 1635 may be stored in a non-transitory computer-readable medium such as system memory or another type of memory. In some cases, the code 1635 may not be directly executable by the at least one processor 1640 but may cause a computer (e.g., when compiled and executed) to perform functions described herein. In some cases, the at least one memory 1630 may include, among other things, a basic I/O system (BIOS) which may control basic hardware or software operation such as the interaction with peripheral components or devices.

The at least one processor 1640 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1640 may be configured to operate a memory array using a memory controller. In some other cases, a memory controller may be integrated into the at least one processor 1640. The at least one processor 1640 may be configured to execute computer-readable instructions stored in a memory (e.g., the at least one memory 1630) to cause the device 1605 to perform various functions (e.g., functions or tasks supporting interleaver adapted for channel estimation quality imbalances). For example, the device 1605 or a component of the device 1605 may include at least one processor 1640 and at least one memory 1630 coupled with or to the at least one processor 1640, the at least one processor 1640 and the at least one memory 1630 configured to perform various functions described herein.

In some examples, the at least one processor 1640 may include multiple processors and the at least one memory 1630 may include multiple memories. One or more of the multiple processors may be coupled with one or more of the multiple memories, which may, individually or collectively, be configured to perform various functions described herein. In some examples, the at least one processor 1640 may be a component of a processing system, which may refer to a system (such as a series) of machines, circuitry (including, for example, one or both of processor circuitry (which may include the at least one processor 1640) and memory circuitry (which may include the at least one memory 1630)), or components, that receives or obtains inputs and processes the inputs to produce, generate, or obtain a set of outputs. The processing system may be configured to perform one or more of the functions described herein. For example, the at least one processor 1640 or a processing system including the at least one processor 1640 may be configured to, configurable to, or operable to cause the device 1605 to perform one or more of the functions described herein. Further, as described herein, being "configured to," being "configurable to," and being "operable to" may be used interchangeably and may be associated with a capability, when executing code 1635 (e.g., processor-executable code) stored in the at least one memory 1630 or otherwise, to perform one or more of the functions described herein.

The communications manager 1620 may support wireless communications in accordance with examples as disclosed herein. For example, the communications manager 1620 is capable of, configured to, or operable to support a means for receiving, from a second wireless device, first signaling indicating a size of a precoding resource block group and an offset parameter indicating an offset between the precoding resource block group and a codeblock. The communications manager 1620 is capable of, configured to, or operable to support a means for transmitting second signaling indicating a resource element starting parameter and a resource element ending parameter in at least one of a time domain and a frequency domain based on the size of the precoding resource block group. The communications manager 1620 is capable of, configured to, or operable to support a means for communicating, with the second wireless device, a coded bit stream that is interleaved in accordance with at least one of the size of the precoding resource block group, the offset parameter, the resource element starting parameter, the resource element ending parameter, or any combination thereof.

By including or configuring the communications manager 1620 in accordance with examples as described herein, the device 1605 may support techniques for improved communication reliability, reduced latency, improved user experience related to reduced processing, reduced power consumption, more efficient utilization of communication resources, longer battery life, and improved utilization of processing capability.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the at least one processor 1640, the at least one memory 1630, the code 1635, or any combination thereof. For example, the code 1635 may include instructions executable by the at least one processor 1640 to cause the device 1605 to perform various aspects of interleaver adapted for channel estimation quality imbalances as described herein, or the at least one processor 1640 and the at least one memory 1630 may be otherwise configured to, individually or collectively, perform or support such operations.

Figure 17:
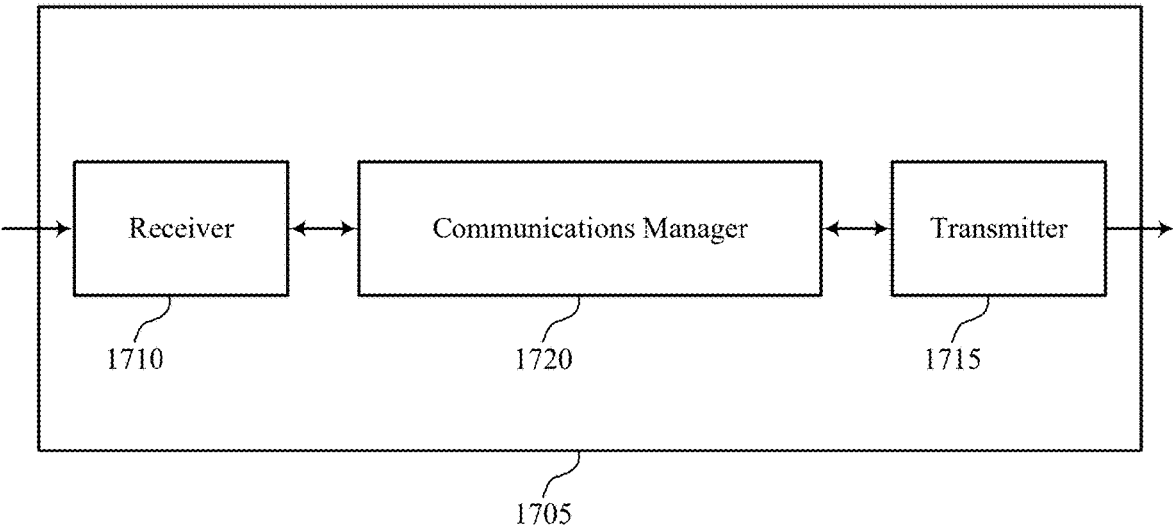
FIGS. 17 and 18 show block diagrams of devices that support interleaver adapted for channel estimation quality imbalances in accordance with one or more aspects of the present disclosure.

FIG. 17 shows a block diagram 1700 of a device 1705 that supports an interleaver adapted for channel estimation quality imbalances in accordance with one or more aspects of the present disclosure. The device 1705 may be an example of aspects of a network entity 105 as described herein. The device 1705 may include a receiver 1710, a transmitter 1715, and a communications manager 1720. The device 1705, or one or more components of the device 1705 (e.g., the receiver 1710, the transmitter 1715, the communications manager 1720), may include at least one processor, which may be coupled with at least one memory, to, individually or collectively, support or enable the described techniques. Each of these components may be in communication with one another (e.g., via one or more buses).

The receiver 1710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1705. In some examples, the receiver 1710 may support obtaining information by receiving signals via one or more antennas. Additionally, or alternatively, the receiver 1710 may support obtaining information by receiving signals via one or more wired (e.g., electrical, fiber optic) interfaces, wireless interfaces, or any combination thereof.

The transmitter 1715 may provide a means for outputting (e.g., transmitting, providing, conveying, sending) information generated by other components of the device 1705. For example, the transmitter 1715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1715 may support outputting information by transmitting signals via one or more antennas. Additionally, or alternatively, the transmitter 1715 may support outputting information by transmitting signals via one or more wired (e.g., electrical, fiber optic) interfaces, wireless interfaces, or any combination thereof. In some examples, the transmitter 1715 and the receiver 1710 may be co-located in a transceiver, which may include or be coupled with a modem.

The communications manager 1720, the receiver 1710, the transmitter 1715, or various combinations or components thereof may be examples of means for performing various aspects of interleaver adapted for channel estimation quality imbalances as described herein. For example, the communications manager 1720, the receiver 1710, the transmitter 1715, or various combinations or components thereof may be capable of performing one or more of the functions described herein.

In some examples, the communications manager 1720, the receiver 1710, the transmitter 1715, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1720, the receiver 1710, the transmitter 1715, or various combinations or components thereof may be implemented in code (e.g., as communications management software or firmware) executed by at least one processor (e.g., referred to as a processor-executable code). If implemented in code executed by at least one processor, the functions of the communications manager 1720, the receiver 1710, the transmitter 1715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1720 may be configured to perform various operations (e.g., receiving, obtaining, monitoring, outputting, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to obtain information, output information, or perform various other operations as described herein.

The communications manager 1720 may support wireless communications in accordance with examples as disclosed herein. For example, the communications manager 1720 is capable of, configured to, or operable to support a means for transmitting, to a second wireless device, first signaling indicating a size of a precoding resource block group and an offset parameter indicating an offset between the precoding resource block group and a codeblock. The communications manager 1720 is capable of, configured to, or operable to support a means for receiving second signaling indicating a resource element starting parameter and a resource element ending parameter in at least one of a time domain and a frequency domain based on the size of the precoding resource block group. The communications manager 1720 is capable of, configured to, or operable to support a means for communicating, with the second wireless device, a coded bit stream that is interleaved in accordance with at least one of the size of the precoding resource block group, the offset parameter, the resource element starting parameter, the resource element ending parameter, or any combination thereof.

By including or configuring the communications manager 1720 in accordance with examples as described herein, the device 1705 (e.g., at least one processor controlling or otherwise coupled with the receiver 1710, the transmitter 1715, the communications manager 1720, or a combination thereof) may support techniques for reduced processing, reduced power consumption, and more efficient utilization of communication resources.

Figure 18:
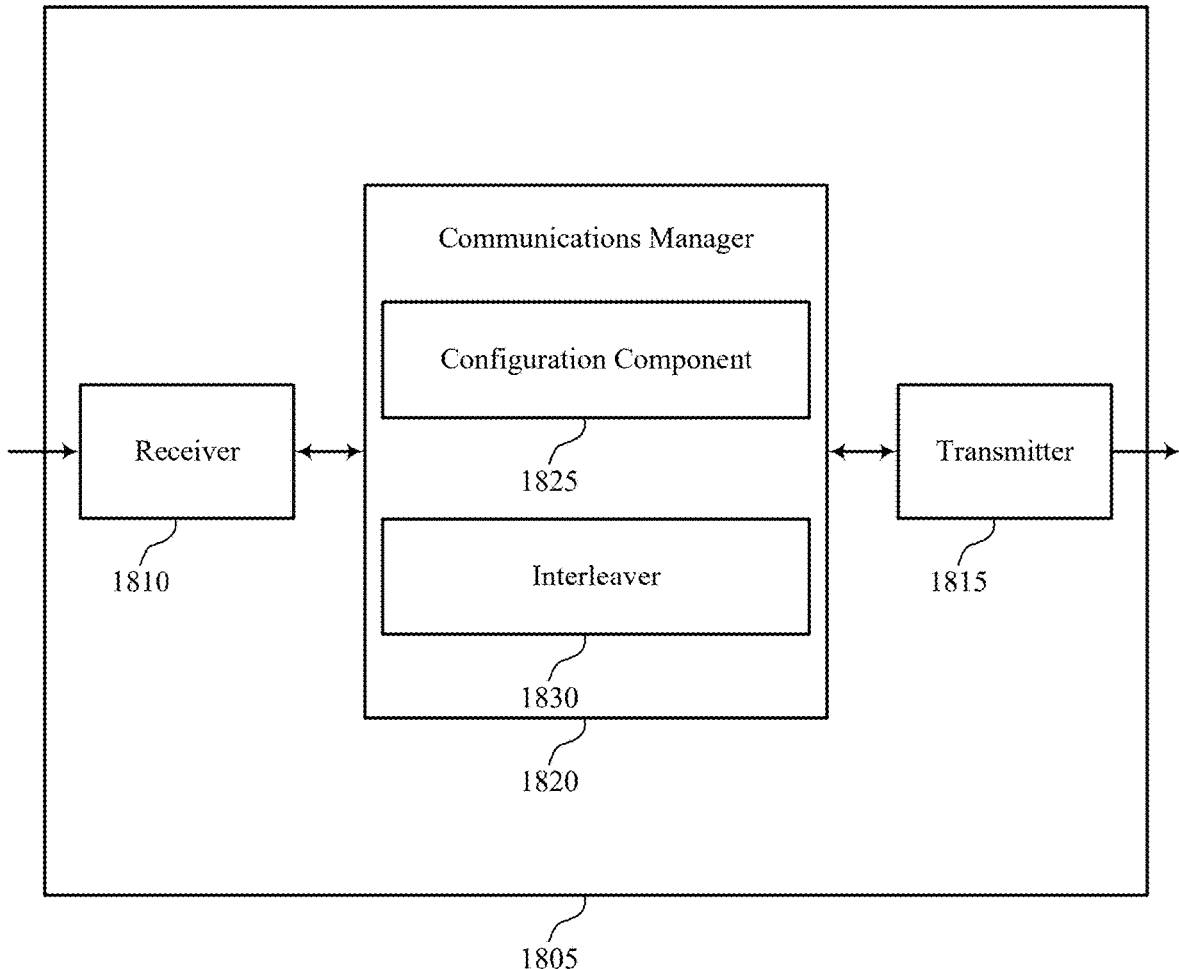

FIG. 18 shows a block diagram 1800 of a device 1805 that supports an interleaver adapted for channel estimation quality imbalances in accordance with one or more aspects of the present disclosure. The device 1805 may be an example of aspects of a device 1705 or a network entity 105 as described herein. The device 1805 may include a receiver 1810, a transmitter 1815, and a communications manager 1820. The device 1805, or one of more components of the device 1805 (e.g., the receiver 1810, the transmitter 1815, the communications manager 1820), may include at least one processor, which may be coupled with at least one memory, to support the described techniques. Each of these components may be in communication with one another (e.g., via one or more buses).

The receiver 1810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1805. In some examples, the receiver 1810 may support obtaining information by receiving signals via one or more antennas.

Additionally, or alternatively, the receiver 1810 may support obtaining information by receiving signals via one or more wired (e.g., electrical, fiber optic) interfaces, wireless interfaces, or any combination thereof.

The transmitter 1815 may provide a means for outputting (e.g., transmitting, providing, conveying, sending) information generated by other components of the device 1805. For example, the transmitter 1815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1815 may support outputting information by transmitting signals via one or more antennas. Additionally, or alternatively, the transmitter 1815 may support outputting information by transmitting signals via one or more wired (e.g., electrical, fiber optic) interfaces, wireless interfaces, or any combination thereof. In some examples, the transmitter 1815 and the receiver 1810 may be co-located in a transceiver, which may include or be coupled with a modem.

The device 1805, or various components thereof, may be an example of means for performing various aspects of interleaver adapted for channel estimation quality imbalances as described herein. For example, the communications manager 1820 may include a configuration component 1825 an interleaver 1830, or any combination thereof. The communications manager 1820 may be an example of aspects of a communications manager 1720 as described herein. In some examples, the communications manager 1820, or various components thereof, may be configured to perform various operations (e.g., receiving, obtaining, monitoring, outputting, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to obtain information, output information, or perform various other operations as described herein.

The communications manager 1820 may support wireless communications in accordance with examples as disclosed herein. The configuration component 1825 is capable of, configured to, or operable to support a means for transmitting, to a second wireless device, first signaling indicating a size of a precoding resource block group and an offset parameter indicating an offset between the precoding resource block group and a codeblock. The configuration component 1825 is capable of, configured to, or operable to support a means for receiving second signaling indicating a resource element starting parameter and a resource element ending parameter in at least one of a time domain and a frequency domain based on the size of the precoding resource block group. The interleaver 1830 is capable of, configured to, or operable to support a means for communicating, with the second wireless device, a coded bit stream that is interleaved in accordance with at least one of the size of the precoding resource block group, the offset parameter, the resource element starting parameter, the resource element ending parameter, or any combination thereof.

Figure 19:
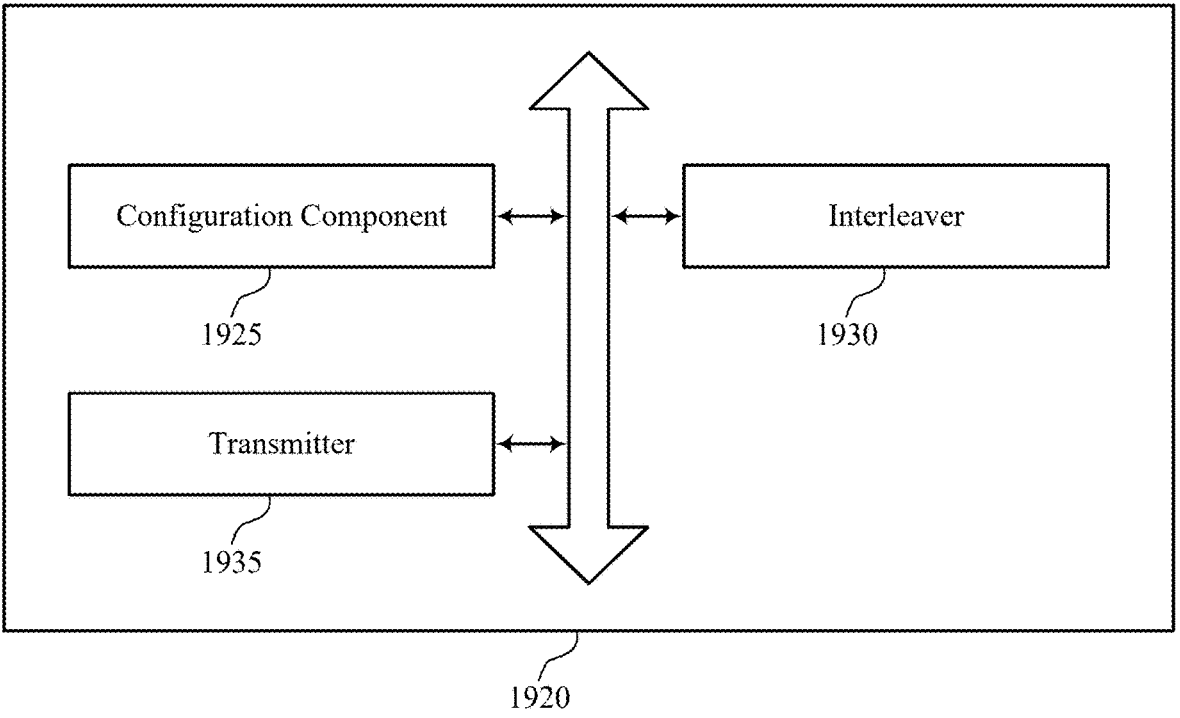
FIG. 19 shows a block diagram of a communications manager that supports an interleaver adapted for channel estimation quality imbalances in accordance with one or more aspects of the present disclosure.

FIG. 19 shows a block diagram 1900 of a communications manager 1920 that supports an interleaver adapted for channel estimation quality imbalances in accordance with one or more aspects of the present disclosure. The communications manager 1920 may be an example of aspects of a communications manager 1720, a communications manager 1820, or both, as described herein. The communications manager 1920, or various components thereof, may be an example of means for performing various aspects of interleaver adapted for channel estimation quality imbalances as described herein. For example, the communications manager 1920 may include a configuration component 1925, an interleaver 1930, a transmitter 1935, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1920 may support wireless communications in accordance with examples as disclosed herein. The configuration component 1925 is capable of, configured to, or operable to support a means for transmitting, to a second wireless device, first signaling indicating a size of a precoding resource block group and an offset parameter indicating an offset between the precoding resource block group and a codeblock. In some examples, the configuration component 1925 is capable of, configured to, or operable to support a means for receiving second signaling indicating a resource element starting parameter and a resource element ending parameter in at least one of a time domain and a frequency domain based on the size of the precoding resource block group. The interleaver 1930 is capable of, configured to, or operable to support a means for communicating, with the second wireless device, a coded bit stream that is interleaved in accordance with at least one of the size of the precoding resource block group, the offset parameter, the resource element starting parameter, the resource element ending parameter, or any combination thereof.

In some examples, to support communicating with the second wireless device, the transmitter 1935 is capable of, configured to, or operable to support a means for transmitting, from the second wireless device, the coded bit stream.

In some examples, the interleaver 1930 is capable of, configured to, or operable to support a means for encoding a set of multiple resource elements into the coded bit stream, where a first set of the set of multiple resource elements includes parity bits and systematic bits, and where a second set of the set of multiple resource elements includes parity bits and no systematic bits.

In some examples, the coded bit stream includes a first set of parity bits located at a beginning of the precoding resource block group and at an ending of the precoding resource block group.

In some examples, the beginning of the precoding resource block group and the ending of the precoding resource block group are based on at least one processing gain threshold.

In some examples, the first signaling is received via a first radio resource control message, first downlink control information, or first uplink control information. In some examples, the second signaling is received via a second radio resource control message, second downlink control information, or second uplink control information.

In some examples, the offset parameter is a resource element offset or a time-symbols offset.

In some examples, the precoding resource block group includes a set of resource precoding resource blocks which are consecutive in a frequency domain.

Figure 20:
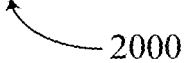
FIG. 20 shows a diagram of a system including a device that supports an interleaver adapted for channel estimation quality imbalances in accordance with one or more aspects of the present disclosure.

FIG. 20 shows a diagram of a system 2000 including a device 2005 that supports an interleaver adapted for channel estimation quality imbalances in accordance with one or more aspects of the present disclosure. The device 2005 may be an example of or include components of a device 1705, a device 1805, or a network entity 105 as described herein. The device 2005 may communicate with other network devices or network equipment such as one or more of the network entities 105, UEs 115, or any combination thereof. The communications may include communications over one or more wired interfaces, over one or more wireless interfaces, or any combination thereof. The device 2005 may include components that support outputting and obtaining communications, such as a communications manager 2020, a transceiver 2010, one or more antennas 2015, at least one memory 2025, code 2030, and at least one processor 2035. These components may be in electronic communication or otherwise coupled (e.g., operatively, communicatively, functionally, electronically, electrically) via one or more buses (e.g., a bus 2040).

The transceiver 2010 may support bi-directional communications via wired links, wireless links, or both as described herein. In some examples, the transceiver 2010 may include a wired transceiver and may communicate bi-directionally with another wired transceiver. Additionally, or alternatively, in some examples, the transceiver 2010 may include a wireless transceiver and may communicate bi-directionally with another wireless transceiver. In some examples, the device 2005 may include one or more antennas 2015, which may be capable of transmitting or receiving wireless transmissions (e.g., concurrently). The transceiver 2010 may also include a modem to modulate signals, to provide the modulated signals for transmission (e.g., by one or more antennas 2015, by a wired transmitter), to receive modulated signals (e.g., from one or more antennas 2015, from a wired receiver), and to demodulate signals. In some implementations, the transceiver 2010 may include one or more interfaces, such as one or more interfaces coupled with the one or more antennas 2015 that are configured to support various receiving or obtaining operations, or one or more interfaces coupled with the one or more antennas 2015 that are configured to support various transmitting or outputting operations, or a combination thereof. In some implementations, the transceiver 2010 may include or be configured for coupling with one or more processors or one or more memory components that are operable to perform or support operations based on received or obtained information or signals, or to generate information or other signals for transmission or other outputting, or any combination thereof. In some implementations, the transceiver 2010, or the transceiver 2010 and the one or more antennas 2015, or the transceiver 2010 and the one or more antennas 2015 and one or more processors or one or more memory components (e.g., the at least one processor 2035, the at least one memory 2025, or both), may be included in a chip or chip assembly that is installed in the device 2005. In some examples, the transceiver 2010 may be operable to support communications via one or more communications links (e.g., communication link(s) 125, backhaul communication link(s) 120, a midhaul communication link 162, a fronthaul communication link 168).

The at least one memory 2025 may include RAM, ROM, or any combination thereof. The at least one memory 2025 may store computer-readable, computer-executable, or processor-executable code, such as the code 2030. The code 2030 may include instructions that, when executed by one or more of the at least one processor 2035, cause the device 2005 to perform various functions described herein. The code 2030 may be stored in a non-transitory computer-readable medium such as system memory or another type of memory. In some cases, the code 2030 may not be directly executable by a processor of the at least one processor 2035 but may cause a computer (e.g., when compiled and executed) to perform functions described herein. In some cases, the at least one memory 2025 may include, among other things, a BIOS which may control basic hardware or software operation such as the interaction with peripheral components or devices. In some examples, the at least one processor 2035 may include multiple processors and the at least one memory 2025 may include multiple memories. One or more of the multiple processors may be coupled with one or more of the multiple memories which may, individually or collectively, be configured to perform various functions herein (for example, as part of a processing system).

The at least one processor 2035 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 2035 may be configured to operate a memory array using a memory controller. In some other cases, a memory controller may be integrated into one or more of the at least one processor 2035. The at least one processor 2035 may be configured to execute computer-readable instructions stored in a memory (e.g., one or more of the at least one memory 2025) to cause the device 2005 to perform various functions (e.g., functions or tasks supporting interleaver adapted for channel estimation quality imbalances). For example, the device 2005 or a component of the device 2005 may include at least one processor 2035 and at least one memory 2025 coupled with one or more of the at least one processor 2035, the at least one processor 2035 and the at least one memory 2025 configured to perform various functions described herein. The at least one processor 2035 may be an example of a cloud-computing platform (e.g., one or more physical nodes and supporting software such as operating systems, virtual machines, or container instances) that may host the functions (e.g., by executing code 2030) to perform the functions of the device 2005. The at least one processor 2035 may be any one or more suitable processors capable of executing scripts or instructions of one or more software programs stored in the device 2005 (such as within one or more of the at least one memory 2025).

In some examples, the at least one processor 2035 may include multiple processors and the at least one memory 2025 may include multiple memories. One or more of the multiple processors may be coupled with one or more of the multiple memories, which may, individually or collectively, be configured to perform various functions herein. In some examples, the at least one processor 2035 may be a component of a processing system, which may refer to a system (such as a series) of machines, circuitry (including, for example, one or both of processor circuitry (which may include the at least one processor 2035) and memory circuitry (which may include the at least one memory 2025)), or components, that receives or obtains inputs and processes the inputs to produce, generate, or obtain a set of outputs. The processing system may be configured to perform one or more of the functions described herein. For example, the at least one processor 2035 or a processing system including the at least one processor 2035 may be configured to, configurable to, or operable to cause the device 2005 to perform one or more of the functions described herein. Further, as described herein, being "configured to," being "configurable to," and being "operable to" may be used interchangeably and may be associated with a capability, when executing code stored in the at least one memory 2025 or otherwise, to perform one or more of the functions described herein.

In some examples, a bus 2040 may support communications of (e.g., within) a protocol layer of a protocol stack. In some examples, a bus 2040 may support communications associated with a logical channel of a protocol stack (e.g., between protocol layers of a protocol stack), which may include communications performed within a component of the device 2005, or between different components of the device 2005 that may be co-located or located in different locations (e.g., where the device 2005 may refer to a system in which one or more of the communications manager 2020, the transceiver 2010, the at least one memory 2025, the code 2030, and the at least one processor 2035 may be located in one of the different components or divided between different components).

In some examples, the communications manager 2020 may manage aspects of communications with a core network 130 (e.g., via one or more wired or wireless backhaul links). For example, the communications manager 2020 may manage the transfer of data communications for client devices, such as one or more UEs 115. In some examples, the communications manager 2020 may manage communications with one or more other network entities 105, and may include a controller or scheduler for controlling communications with UEs 115 (e.g., in cooperation with the one or more other network devices). In some examples, the communications manager 2020 may support an X2 interface within an LTE/LTE-A wireless communications network technology to provide communication between network entities 105.

The communications manager 2020 may support wireless communications in accordance with examples as disclosed herein. For example, the communications manager 2020 is capable of, configured to, or operable to support a means for transmitting, to a second wireless device, first signaling indicating a size of a precoding resource block group and an offset parameter indicating an offset between the precoding resource block group and a codeblock. The communications manager 2020 is capable of, configured to, or operable to support a means for receiving second signaling indicating a resource element starting parameter and a resource element ending parameter in at least one of a time domain and a frequency domain based on the size of the precoding resource block group. The communications manager 2020 is capable of, configured to, or operable to support a means for communicating, with the second wireless device, a coded bit stream that is interleaved in accordance with at least one of the size of the precoding resource block group, the offset parameter, the resource element starting parameter, the resource element ending parameter, or any combination thereof.

By including or configuring the communications manager 2020 in accordance with examples as described herein, the device 2005 may support techniques for improved communication reliability, reduced latency, improved user experience related to reduced processing, reduced power consumption, more efficient utilization of communication resources, longer battery life, and improved utilization of processing capability.

In some examples, the communications manager 2020 may be configured to perform various operations (e.g., receiving, obtaining, monitoring, outputting, transmitting) using or otherwise in cooperation with the transceiver 2010, the one or more antennas 2015 (e.g., where applicable), or any combination thereof. Although the communications manager 2020 is illustrated as a separate component, in some examples, one or more functions described with reference to the communications manager 2020 may be supported by or performed by the transceiver 2010, one or more of the at least one processor 2035, one or more of the at least one memory 2025, the code 2030, or any combination thereof (for example, by a processing system including at least a portion of the at least one processor 2035, the at least one memory 2025, the code 2030, or any combination thereof). For example, the code 2030 may include instructions executable by one or more of the at least one processor 2035 to cause the device 2005 to perform various aspects of interleaver adapted for channel estimation quality imbalances as described herein, or the at least one processor 2035 and the at least one memory 2025 may be otherwise configured to, individually or collectively, perform or support such operations.

FIG. 21 shows a flowchart illustrating a method 2100 that supports an interleaver adapted for channel estimation quality imbalances in accordance with one or more aspects of the present disclosure. The operations of the method 2100 may be implemented by a UE or its components as described herein. For example, the operations of the method 2100 may be performed by a UE 115 as described with reference to FIGS. 1 through 16. In some examples, a UE may execute a set of instructions to control the functional elements of the UE to perform the described functions. Additionally, or alternatively, the UE may perform aspects of the described functions using special-purpose hardware.

At 2105, the method may include receiving, from a second wireless device, first signaling indicating a size of a precoding resource block group and an offset parameter indicating an offset between the precoding resource block group and a codeblock. The operations of 2105 may be performed in accordance with examples as disclosed herein. In some examples, aspects of the operations of 2105 may be performed by a configuration component 1525 as described with reference to FIG. 15.

At 2110, the method may include transmitting second signaling indicating a resource element starting parameter and a resource element ending parameter in at least one of a time domain and a frequency domain based on the size of the precoding resource block group. The operations of 2110 may be performed in accordance with examples as disclosed herein. In some examples, aspects of the operations of 2110 may be performed by a configuration component 1525 as described with reference to FIG. 15.

At 2115, the method may include communicating, with the second wireless device, a coded bit stream that is interleaved in accordance with at least one of the size of the precoding resource block group, the offset parameter, the resource element starting parameter, the resource element ending parameter, or any combination thereof. The operations of 2115 may be performed in accordance with examples as disclosed herein. In some examples, aspects of the operations of 2115 may be performed by an interleaver 1530 as described with reference to FIG. 15.

FIG. 22 shows a flowchart illustrating a method 2200 that supports an interleaver adapted for channel estimation quality imbalances in accordance with one or more aspects of the present disclosure. The operations of the method 2200 may be implemented by a network entity or its components as described herein. For example, the operations of the method 2200 may be performed by a network entity as described with reference to FIGS. 1 through 12 and 17 through 20. In some examples, a network entity may execute a set of instructions to control the functional elements of the network entity to perform the described functions. Additionally, or alternatively, the network entity may perform aspects of the described functions using special-purpose hardware.

At 2205, the method may include transmitting, to a second wireless device, first signaling indicating a size of a precoding resource block group and an offset parameter indicating an offset between the precoding resource block group and a codeblock. The operations of 2205 may be performed in accordance with examples as disclosed herein. In some examples, aspects of the operations of 2205 may be performed by a configuration component 1925 as described with reference to FIG. 19.

At 2210, the method may include receiving second signaling indicating a resource element starting parameter and a resource element ending parameter in at least one of a time domain and a frequency domain based on the size of the precoding resource block group. The operations of 2210 may be performed in accordance with examples as disclosed herein. In some examples, aspects of the operations of 2210 may be performed by a configuration component 1925 as described with reference to FIG. 19.

At 2215, the method may include communicating, with the second wireless device, a coded bit stream that is interleaved in accordance with at least one of the size of the precoding resource block group, the offset parameter, the resource element starting parameter, the resource element ending parameter, or any combination thereof. The operations of 2215 may be performed in accordance with examples as disclosed herein. In some examples, aspects of the operations of 2215 may be performed by an interleaver 1930 as described with reference to FIG. 19.

The following provides an overview of aspects of the present disclosure:

Aspect 1: A method for wireless communications at a first wireless device, comprising: receiving, from a second wireless device, first signaling indicating a size of a precoding resource block group and an offset parameter indicating an offset between the precoding resource block group and a codeblock; transmitting second signaling indicating a resource element starting parameter and a resource element ending parameter in at least one of a time domain and a frequency domain based at least in part on the size of the precoding resource block group; and communicating, with the second wireless device, a coded bit stream that is interleaved in accordance with at least one of the size of the precoding resource block group, the offset parameter, the resource element starting parameter, the resource element ending parameter, or any combination thereof.

Aspect 2: The method of aspect 1, wherein the first signaling further indicates whether the offset between the precoding resource block group and the codeblock is a vector in a frequency domain or a time domain, and the second signaling further indicates whether the resource element starting parameter and the resource element ending parameter are in the frequency domain or the time domain.

Aspect 3: The method of any of aspects 1 through 2, wherein communicating with the second wireless device further comprises: receiving, from the second wireless device, the coded bit stream; and decoding the coded bit stream based at least in part on the offset parameter, the resource element starting parameter, and the resource element ending parameter.

Aspect 4: The method of aspect 3, wherein decoding the coded bit stream further comprises: decoding the coded bit stream into a plurality of resource elements, wherein a first set of the plurality of resource elements includes parity bits and systematic bits, and wherein a second set of the plurality of resource elements includes parity bits and no systematic bits.

Aspect 5: The method of any of aspects 3 through 4, wherein the coded bit stream comprises a first set of parity bits located at a beginning of the precoding resource block group and at an ending of the precoding resource block group.

Aspect 6: The method of aspect 5, wherein the beginning of the precoding resource block group and the ending of the precoding resource block group are based at least in part on at least one processing gain threshold.

Aspect 7: The method of any of aspects 1 through 6, wherein the first signaling is received via a first radio resource control message, first downlink control information, or first uplink control information, and the second signaling is received via a second radio resource control message, second downlink control information, or second uplink control information.

Aspect 8: The method of any of aspects 1 through 7, wherein the offset parameter is a resource element offset or a time-symbols offset.

Aspect 9: The method of any of aspects 1 through 8, wherein the precoding resource block group comprises a set of resource precoding resource blocks which are consecutive in a frequency domain.

Aspect 10: A method for wireless communications at a first wireless device, comprising: transmitting, to a second wireless device, first signaling indicating a size of a precoding resource block group and an offset parameter indicating an offset between the precoding resource block group and a codeblock; receiving second signaling indicating a resource element starting parameter and a resource element ending parameter in at least one of a time domain and a frequency domain based at least in part on the size of the precoding resource block group; and communicating, with the second wireless device, a coded bit stream that is interleaved in accordance with at least one of the size of the precoding resource block group, the offset parameter, the resource element starting parameter, the resource element ending parameter, or any combination thereof.

Aspect 11: The method of aspect 10, wherein communicating with the second wireless device further comprises: transmitting, from the second wireless device, the coded bit stream.

Aspect 12: The method of aspect 11, further comprising: encoding a plurality of resource elements into the coded bit stream, wherein a first set of the plurality of resource elements includes parity bits and systematic bits, and wherein a second set of the plurality of resource elements includes parity bits and no systematic bits.

Aspect 13: The method of any of aspects 10 through 12, wherein the coded bit stream comprises a first set of parity bits located at a beginning of the precoding resource block group and at an ending of the precoding resource block group.

Aspect 14: The method of aspect 13, wherein the beginning of the precoding resource block group and the ending of the precoding resource block group are based at least in part on at least one processing gain threshold.

Aspect 15: The method of any of aspects 10 through 14, wherein the first signaling is received via a first radio resource control message, first downlink control information, or first uplink control information, and the second signaling is received via a second radio resource control message, second downlink control information, or second uplink control information.

Aspect 16: The method of any of aspects 10 through 15, wherein the offset parameter is a resource element offset or a time-symbols offset.

Aspect 17: The method of any of aspects 10 through 16, wherein the precoding resource block group comprises a set of resource precoding resource blocks which are consecutive in a frequency domain.

Aspect 18: A first wireless device for wireless communications, comprising one or more memories storing processor-executable code, and one or more processors coupled with the one or more memories and individually or collectively operable to execute the code to cause the first wireless device to perform a method of any of aspects 1 through 9.

Aspect 19: A first wireless device for wireless communications, comprising at least one means for performing a method of any of aspects 1 through 9.

Aspect 20: A non-transitory computer-readable medium storing code for wireless communications, the code comprising instructions executable by one or more processors to perform a method of any of aspects 1 through 9.

Aspect 21: A first wireless device for wireless communications, comprising one or more memories storing processor-executable code, and one or more processors coupled with the one or more memories and individually or collectively operable to execute the code to cause the first wireless device to perform a method of any of aspects 10 through 17.

Aspect 22: A first wireless device for wireless communications, comprising at least one means for performing a method of any of aspects 10 through 17.

Aspect 23: A non-transitory computer-readable medium storing code for wireless communications, the code comprising instructions executable by one or more processors to perform a method of any of aspects 10 through 17.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:
one or more memories storing processor-executable code; and
one or more processors coupled with the one or more memories and individually or collectively operable to execute the code to cause the first wireless device to:
receive, from a second wireless device, first signaling indicating a size of a precoding resource block group and an offset parameter indicating an offset between the precoding resource block group and a codeblock;
transmit second signaling indicating a resource element starting parameter and a resource element ending parameter in at least one of a time domain and a frequency domain based at least in part on the size of the precoding resource block group; and
communicate, with the second wireless device, a coded bit stream that is interleaved in accordance with at least one of the size of the precoding resource block group, the offset parameter, the resource element starting parameter, the resource element ending parameter, or any combination thereof.

2. The first wireless device of claim 1, wherein:
the first signaling further indicates whether the offset between the precoding resource block group and the codeblock is a vector in a frequency domain or a time domain, and
the second signaling further indicates whether the resource element starting parameter and the resource element ending parameter are in the frequency domain or the time domain.

3. The first wireless device of claim 1, wherein, to communicate with the second wireless device, the one or more processors are individually or collectively further operable to execute the code to cause the first wireless device to:
receive, from the second wireless device, the coded bit stream; and
decode the coded bit stream based at least in part on the offset parameter, the resource element starting parameter, and the resource element ending parameter.

4. The first wireless device of claim 3, wherein, to decode the coded bit stream, the one or more processors are individually or collectively further operable to execute the code to cause the first wireless device to:
decode the coded bit stream into a plurality of resource elements, wherein a first set of the plurality of resource elements includes parity bits and systematic bits, and wherein a second set of the plurality of resource elements includes parity bits and no systematic bits.

5. The first wireless device of claim 3, wherein the coded bit stream comprises a first set of parity bits located at a beginning of the precoding resource block group and at an ending of the precoding resource block group.

6. The first wireless device of claim 5, wherein the beginning of the precoding resource block group and the ending of the precoding resource block group are based at least in part on at least one processing gain threshold.

7. The first wireless device of claim 1, wherein:
the first signaling is received via a first radio resource control message, first downlink control information, or first uplink control information, and
the second signaling is received via a second radio resource control message, second downlink control information, or second uplink control information.

8. The first wireless device of claim 1, wherein the offset parameter is a resource element offset or a time-symbols offset.

9. The first wireless device of claim 1, wherein the precoding resource block group comprises a set of resource precoding resource blocks which are consecutive in a frequency domain.

10. A first wireless device, comprising:
one or more memories storing processor-executable code; and
one or more processors coupled with the one or more memories and individually or collectively operable to execute the code to cause the first wireless device to:
transmit, to a second wireless device, first signaling indicating a size of a precoding resource block group and an offset parameter indicating an offset between the precoding resource block group and a codeblock;
receive second signaling indicating a resource element starting parameter and a resource element ending parameter in at least one of a time domain and a frequency domain based at least in part on the size of the precoding resource block group; and
communicate, with the second wireless device, a coded bit stream that is interleaved in accordance with at least one of the size of the precoding resource block group, the offset parameter, the resource element starting parameter, the resource element ending parameter, or any combination thereof.

11. The first wireless device of claim 10, wherein, to communicate with the second wireless device, the one or more processors are individually or collectively further operable to execute the code to cause the first wireless device to:
transmit, from the second wireless device, the coded bit stream.

12. The first wireless device of claim 11, wherein the one or more processors are individually or collectively further operable to execute the code to cause the first wireless device to:
encode a plurality of resource elements into the coded bit stream, wherein a first set of the plurality of resource elements includes parity bits and systematic bits, and wherein a second set of the plurality of resource elements includes parity bits and no systematic bits.

13. The first wireless device of claim 10, wherein the coded bit stream comprises a first set of parity bits located at a beginning of the precoding resource block group and at an ending of the precoding resource block group.

14. The first wireless device of claim 13, wherein the beginning of the precoding resource block group and the ending of the precoding resource block group are based at least in part on at least one processing gain threshold.

15. The first wireless device of claim 10, wherein:

the first signaling is received via a first radio resource control message, first downlink control information, or first uplink control information, and the second signaling is received via a second radio resource control message, second downlink control information, or second uplink control information.

16. The first wireless device of claim 10, wherein the offset parameter is a resource element offset or a time-symbols offset.

17. The first wireless device of claim 10, wherein the precoding resource block group comprises a set of resource precoding resource blocks which are consecutive in a frequency domain.

18. A method for wireless communications at a first wireless device, comprising:

receiving, from a second wireless device, first signaling indicating a size of a precoding resource block group and an offset parameter indicating an offset between the precoding resource block group and a codeblock;

transmitting second signaling indicating a resource element starting parameter and a resource element ending parameter in at least one of a time domain and a frequency domain based at least in part on the size of the precoding resource block group; and communicating, with the second wireless device, a coded bit stream that is interleaved in accordance with at least one of the size of the precoding resource block group, the offset parameter, the resource element starting parameter, the resource element ending parameter, or any combination thereof.

19. The method of claim 18, wherein communicating with the second wireless device further comprises:

receiving, from the second wireless device, the coded bit stream; and decoding the coded bit stream based at least in part on the offset parameter, the resource element starting parameter, and the resource element ending parameter.

20. The method of claim 19, wherein decoding the coded bit stream further comprises:

decoding the coded bit stream into a plurality of resource elements, wherein a first set of the plurality of resource elements includes parity bits and systematic bits, and wherein a second set of the plurality of resource elements includes parity bits and no systematic bits.

* * * * *